(12) United States Patent
Hunter

(10) Patent No.: US 7,980,515 B2
(45) Date of Patent: Jul. 19, 2011

(54) AIRCRAFT WING MODIFICATION AND RELATED METHODS

(75) Inventor: Courtney Heath Hunter, Winfield (CA)

(73) Assignee: 0832042 B.C. Ltd., Winfield (CA)

(*) Notice: Subject to any disclaimer, the term of this patent is extended or adjusted under 35 U.S.C. 154(b) by 775 days.

(21) Appl. No.: 11/996,953

(22) PCT Filed: Apr. 25, 2007

(86) PCT No.: PCT/CA2007/000701
§ 371 (c)(1),
(2), (4) Date: Jan. 25, 2008

(87) PCT Pub. No.: WO2008/022428
PCT Pub. Date: Feb. 28, 2008

(65) Prior Publication Data
US 2010/0148010 A1    Jun. 17, 2010

Related U.S. Application Data

(60) Provisional application No. 60/840,007, filed on Aug. 25, 2006.

(51) Int. Cl.
B64C 3/28 (2006.01)
(52) U.S. Cl. .................. 244/198; 244/124
(58) Field of Classification Search ............ 244/35 R, 244/199.2, 131–132, 124, 214, 215, 123.1, 244/198
See application file for complete search history.

(56) References Cited

U.S. PATENT DOCUMENTS

| | | | | |
|---|---|---|---|---|
| 2,370,801 A * | 3/1945 | Klose | ............ | 244/35 R |
| 2,375,858 A * | 5/1945 | Makaroff | ....... | 244/124 |
| 2,769,602 A * | 11/1956 | Furlong | ....... | 244/199.2 |
| 2,881,994 A * | 4/1959 | Michael | ....... | 244/124 |
| 3,430,898 A | 3/1969 | Parechanian et al. | | |
| 3,659,810 A * | 5/1972 | Robertson | ....... | 244/76 R |
| 4,050,651 A * | 9/1977 | Neal et al. | ....... | 244/35 R |
| 4,200,253 A | 4/1980 | Rowarth | | |
| 4,240,597 A | 12/1980 | Ellis et al. | | |
| 4,655,412 A * | 4/1987 | Hinkleman | ....... | 244/35 R |
| 4,667,906 A | 5/1987 | Suarez et al. | | |
| 4,674,712 A * | 6/1987 | Whitener et al. | ....... | 244/131 |
| 4,714,215 A | 12/1987 | Jupp et al. | | |
| 5,039,032 A * | 8/1991 | Rudolph | ....... | 244/35 R |
| 5,213,287 A | 5/1993 | Barron | | |
| 5,407,153 A | 4/1995 | Kirk et al. | | |
| 6,467,730 B2 * | 10/2002 | Laugt | ....... | 244/134 B |
| 6,722,615 B2 * | 4/2004 | Heller et al. | ....... | 244/199.4 |
| 7,275,722 B2 * | 10/2007 | Irving et al. | ....... | 244/201 |

FOREIGN PATENT DOCUMENTS

CA 711625 B 6/1965

OTHER PUBLICATIONS

International Search Report for PCT/CA2007/000701, International Searching Authority, Aug. 6, 2007, pp. 1-5.

\* cited by examiner

*Primary Examiner* — Galen Barefoot
(74) *Attorney, Agent, or Firm* — Oyen Wiggs Green & Mutala LLP

(57) ABSTRACT

A transferable modified leading edge for a wing is detachably mountable to a parent wing. The parent wing may use a NACA 23000-series airfoil. A modified wing tip may be used in conjunction with the modified leading edge. The modified leading edge can be mounted to a parent wing in a way that does not damage the parent wing. The modified leading edge and wing tip can provide increased lift.

25 Claims, 11 Drawing Sheets

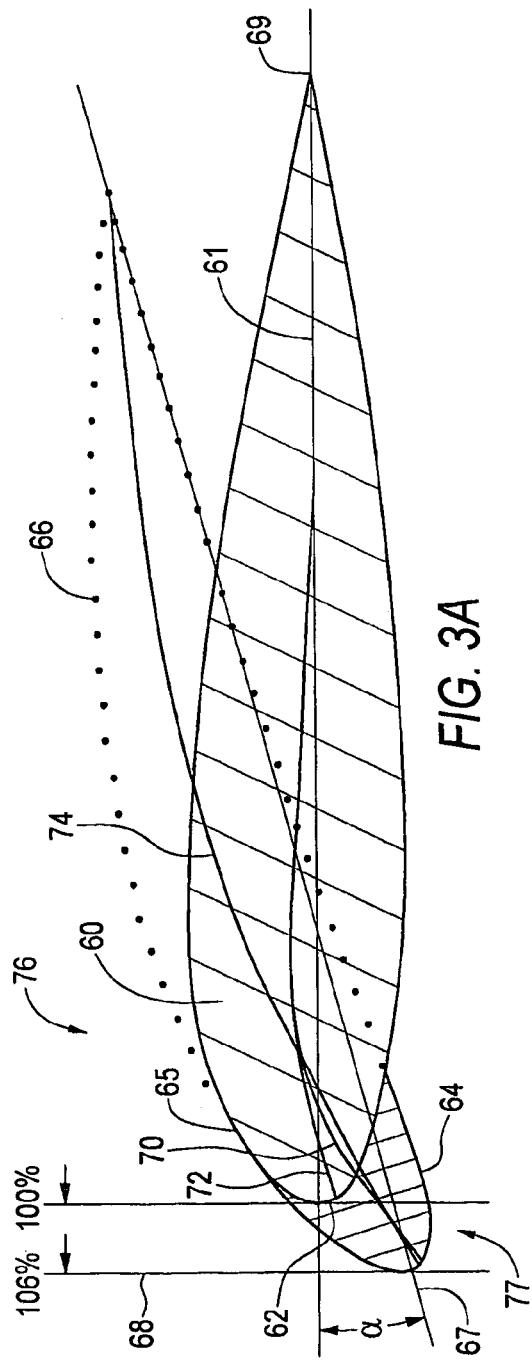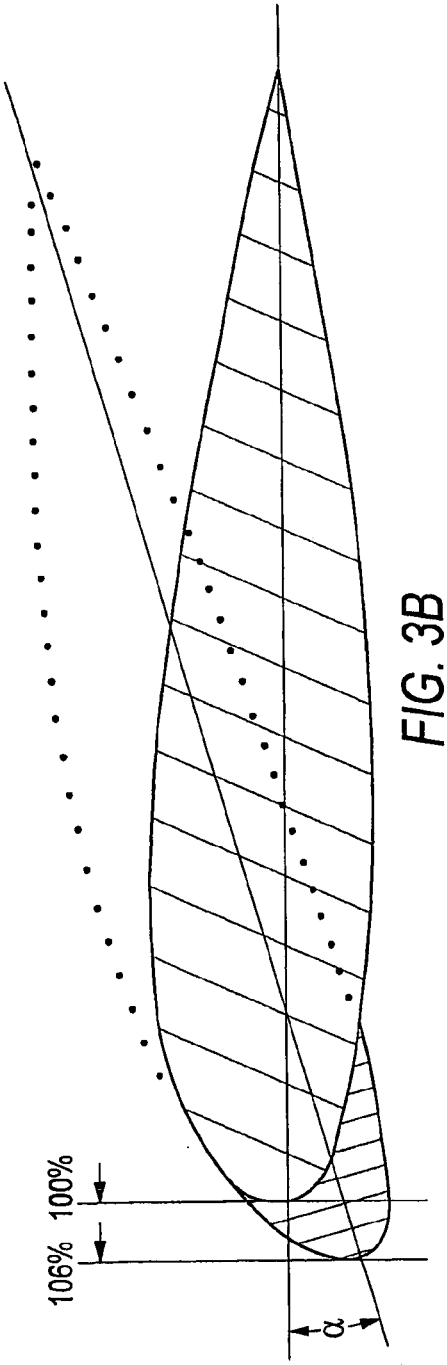

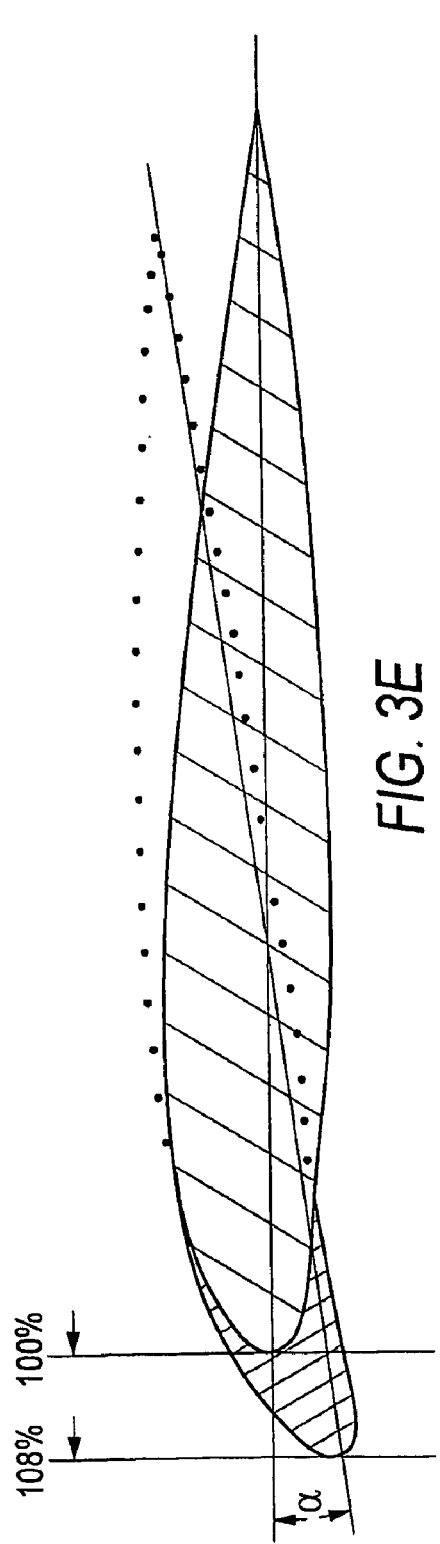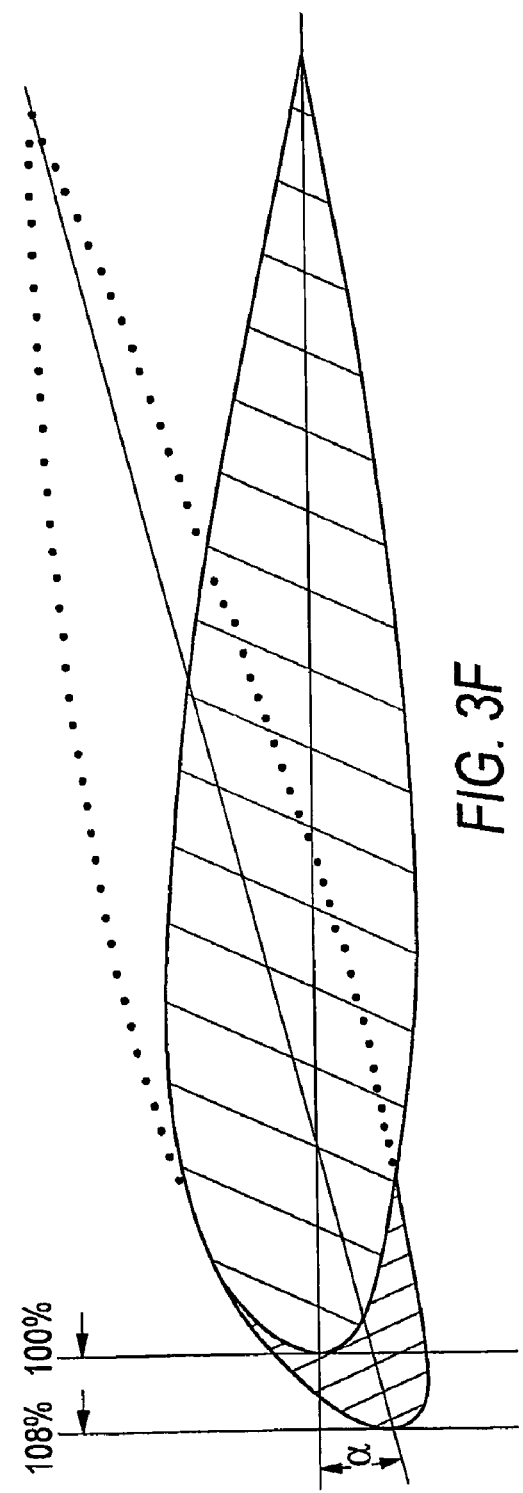

AIRCRAFT WING MODIFICATION AND RELATED METHODS

CROSS-REFERENCE TO RELATED APPLICATION

This application claims Paris Convention priority from U.S. patent application No. 60/840,007 filed on 25 Aug. 2006. For purposes of the United States of America, this application claims the benefit under 35 U.S.C. §119 of U.S. application No. 60/840,007 filed on 25 Aug. 2006, which is hereby incorporated herein by reference.

TECHNICAL FIELD

The invention relates to aircraft. One aspect of the invention relates to leading-edge modifications that alter the aerodynamic characteristics of aircraft wings.

BACKGROUND

Aircraft wings and other airfoils are shaped to provide a reaction force as they are moved through the air. In the case of a wing, the desired reaction force is lift. The shape of an airfoil is a primary factor that determines aerodynamic characteristics of the airfoil. One measure of the performance of an airfoil is the ratio of lift to drag. Ideally an airfoil has a high ratio of lift to drag.

A wide variety of airfoil shapes are known. Selecting an airfoil shape involves trading off various airfoil characteristics. For example, there are tradeoffs between lift, drag, and stall characteristics. An airplane wing may have a cross sectional shape that varies along the length of the wing. For example, A wing of an airplane may have one airfoil shape at its root and another airfoil shape at its tip.

Various identification schemes are used to identify airfoil shapes. The National Advisory Committee for Aeronautics (NACA) has developed one orderly system of identifying airfoils. The NACA system includes several families of airfoils. One such family NACA developed is the five digit series. Airfoils in this series are identified by five-digit numbers. The first digit has a value that is ⅔ of the design lift coefficient (in tenths). The second and third digits form a two-digit number having a value that is twice the position of the maximum camber in tenths of chord. The final two digits indicate the maximum thickness in percentage of chord.

One group of airfoils within the NACA five-digit series of airfoils are the 23000-series airfoils. These airfoils have a design lift coefficient of 0.3 and a position of maximum camber at 0.15 of the chord length. The airfoils in the series differ in thickness. NACA 23000-series airfoils tend to offer relatively high lift combined with relatively low drag at cruising speeds. NACA 23000 series airfoils are used on a range of aircraft, including but not limited to the CESSNA™ CARAVAN™ 208 aircraft (which has a wing that at its root has a NACA 23017.424 airfoil and at its tip has a NACA 23012 airfoil) and the BEACHCRAFT™ KING AIR™ aircraft (which has a NACA 23018 airfoil at the root of the wings, blending to a NACA 23012 airfoil at the wing tips).

While the characteristics or profile of NACA 23000-series airfoils are generally satisfactory, there are some significant shortcomings associated with NACA 23000 series airfoils. For example:

NACA 23000-series airfoils can suffer from reduced lift in hot climates;
NACA 23000-series airfoils can suffer from reduced lift under icing conditions, even with protector systems on.
Under icing conditions, NACA 23000-series airfoils have been known to exhibit leading edge stall.

Manufacturers design aircraft to have performance characteristics acceptable for a range of applications. For a specific application, the aerodynamic performance of a particular aircraft may not be ideal. For example, for some applications it might be desirable to have increased lift even if this comes at the expense of increased drag.

Canadian Patent No. 2,054,807 to Barron entitled WING MODIFICATION METHOD AND APPARATUS describes a modification kit for the DeHavilland DH-2 Beaver and the DH-3 Otter aircraft. The modification kit provides a replacement leading edge for the wing together with replacement droop wing tips and wing fence. Holes are drilled into the leading edge of the wing to mount the replacement leading edge on the wing. Thus, attaching the replacement leading edge damages the internal structure of the wing such that the aircraft cannot be returned to its original configuration without significant repair work.

The inventor has recognized various needs that are currently not satisfied including needs for:
ways to reversibly modify the aerodynamic characteristics of airplane wings or other aerodynamic structures.
improved airfoil designs that provide high ratios of lift to drag.
ways to improve aerodynamic characteristics of airplanes having wings incorporating NACA 23000-series airfoils.
ways to provide increased lift in CESSNA CARAVAN and BEACHCRAFT KING AIR aircraft.

SUMMARY OF THE INVENTION

One aspect of the invention provides a modified leading edge for a wing. The modified leading edge comprises a plurality of pads affixable to a wing to be modified, and a leading edge comprising a connector detachably removable from the plurality of pads. In some embodiments the pads are adhesively affixable to the parent wing.

Another aspect of the invention provides a composite airfoil comprising a central portion and trailing edge having a profile corresponding to a first airfoil having a first chord length; and, a leading edge having a profile corresponding to a front section of a second airfoil having a second chord length. The second airfoil has a second chord line inclined downwardly at an angle $\alpha$ with respect to a first chord line of the first airfoil. The second chord line intersects the first chord line at a location forward of the trailing edge by a distance in the range of 84 to 93 percent of the first chord length.

Further aspects of the invention and features of specific embodiments of the invention are described below.

BRIEF DESCRIPTION OF THE DRAWINGS

The appended drawings and tables illustrate non-limiting embodiments of the invention.

FIG. 3A is an overlay of a NACA 23017.424 parent airfoil and a NACA 6415 airfoil which can be used to identify a portion of the NACA 6415 airfoil to be used as a modified leading edge.

FIG. 3B is an overlay of a NACA 23017.424 parent airfoil and a Clark Y airfoil which can be used to identify a portion of the Clark Y airfoil to be used as a modified leading edge.

FIG. 3E is an overlay of a NACA 23012 parent airfoil and a NACA 6210 airfoil which can be used to identify a portion of the NACA 6210 airfoil to be used as a modified leading edge.

FIG. 3F is an overlay of a NACA 23017.424 parent airfoil and a NACA 6215 airfoil which can be used to identify a portion of the NACA 6215 airfoil to be used as a modified leading edge.

Figure 1:
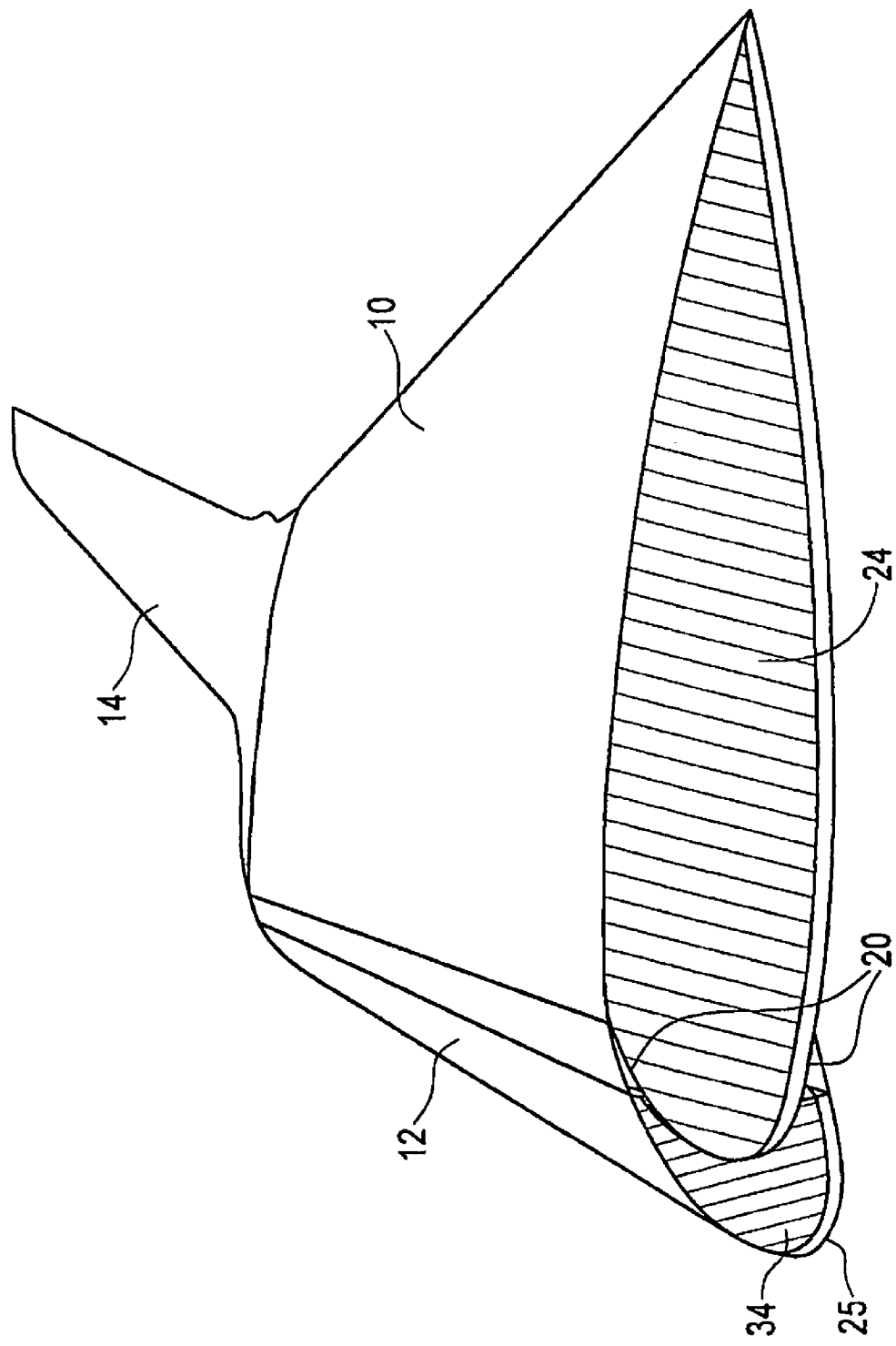
FIG. 1 is a perspective view of a NACA 23000-series airfoil wing with a modified leading edge and a winglet installed thereon.

Table 1 sets out the coordinates for a model-sized composite airfoil defined by a NACA 23017.424 parent airfoil having a modified leading edge based upon a NACA 6215 airfoil.

Table 2 sets out the coordinates for the composite airfoil of Table 1 wherein the chord length has been normalized to facilitate scaling.

Table 3 sets out the coordinates for a model-sized tip composite airfoil defined by a NACA 23012 parent airfoil having a modified leading edge based upon a NACA 6210 airfoil.

Table 4 sets out the coordinates for the composite airfoil of Table 3 wherein the chord length has been normalized to facilitate scaling.

Table 5 sets out the effect of surface area on coefficient of lift for a CESSNA CARAVAN 208 to fly at 8000 pounds gross weight.

Table 6 sets out the effect of surface area on coefficient of lift for a CESSNA CARAVAN 208 to fly at 8360 pounds gross weight.

Table 7 sets out the effect of surface area on coefficient of lift for a CESSNA CARAVAN 208 to fly at 9000 pounds gross weight.

List of Reference Symbols parent wing 10
leading edge of parent wing 10A
modified leading edge 12
modified wing tip 14
leading edge attachment pads 20
first group of pads 20A
second group of pads 20B
adhesive 23
rib of parent wing 24
leading edge shell 25
projections 28A, 28B
apertures 29A, 29B
pin 30
elongated member 32
internal supports 34
web 36
peripheral flange 38
front edge of internal support 40A
rear edge of internal support 40B -continued List of Reference Symbols rivets 41
protective sheet 42
upper spine 44A
lower spine 44B
covering 45
fairing compound 46
wingtip extension 48
winglet 50
coupling structure 52
spar 53
fastening means 54
winglet root 55
first (parent) airfoil 60
chord line of first airfoil 61
leading edge of first airfoil 62
front section of second airfoil 64
point of intersection 65
second airfoil 66
chord line of second airfoil 67
line 68
trailing edge of first airfoil 69
camber line of composite airfoil 70
camber line of first airfoil 72
camber line of second airfoil 74
composite airfoil 76
modified leading edge 77
first portion of wing 80
second portion of wing 82
discontinuity 84
station line 85

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of the invention provides a modified leading edge for a wing or other aerodynamic structure and a method for modifying the leading edge of a wing or other aerodynamic structure. The modified leading edge may be applied, for example, to the wings of an airplane. The modified leading edges alter aerodynamic characteristics of the wings. The term "wing" is used herein to refer to the entire wing structure of an aircraft except where the context requires otherwise. The term "airfoil" is used herein to describe the cross-sectional shape of a wing or other aerodynamic structure.

In some embodiments, the modified leading edge droops. Affixing a drooping leading edge to a parent wing creates a hybrid wing that is more highly cambered than the parent wing and may have a higher coefficient of lift. Further, providing a drooping leading edge can result in the hybrid wing having a lower stall speed than the parent wing. Thus, modifying the wings of an airplane by adding modified leading edges that droop relative to the leading edges of the original, unmodified, wings can improve the ability of the airplane to fly at slow speeds and can increase lift. This can be highly beneficial when flying at high temperatures, high elevations, in conditions under which icing of the wings could occur, or when taking off or landing in locations where a short take off or landing is required.

FIG. 1 shows a parent wing 10 to which a modified leading edge 12 has been attached. A modified leading edge 12 is attached to the wings on either side of the aircraft. The modified leading edge for the port and starboard sides of the aircraft are mirror images of one another. FIG. 1 also shows a modified wing tip 14 affixed at the end of parent wing 10.

FIGS. 2A to 2D illustrate one way in which modified leading edge 12 can be attached to a parent wing 10. A plurality of leading edge attachment pads 20 are mounted along leading edge 10A of parent wing 10. Leading edge 12 couples to attachment pads 20. Attachment pads 20 may be affixed to parent wing 10 with an adhesive 23 that is secure under all conditions that could occur in use but is removable. Embodiments having attachment pads 20 that are removable from parent wing 10 permit a modified leading edge 12 to be mounted to and subsequently removed from a parent wing 10 without damaging the internal structure of parent wing 10 or perforating the skin of parent wing 10.

Although not preferred, and not present or required in many embodiments, alternative or additional fastening means such as rivets, screws, bolts, or the like could be provided to fasten pads 20 to parent wing 10.

In the illustrated embodiment, attachment pads 20 are arranged in a first group 20A and a second group 20B. Pads 20 of first group 20A are arranged in a line extending on an upper side of parent wing 10. Pads 20 of second group 20B are arranged in a line extending on a lower side of parent wing 10. In some embodiments, pads 20 are each mounted at a location that is over a rib 24 of parent wing 10.

In the illustrated embodiments, pads 20 of first group 20A comprise a plurality of closely-spaced generally-rectangular pads. Pads 20 of second group 20B may be arranged similarly. Pads 20 may have rounded corners (not shown) to avoid concentration of stress at corners of pads 20. In an example embodiment, pads 20 are each in the range of 2 inches to 12 inches long. For example, pads 20 may be approximately 6 inches long.

Since modified leading edge 12 is attached to parent wing 10 by a plurality of pads 20, any failure of the adhesive holding one pad 20 will tend not to affect the adhesion of other pads 20.

Pads 20 may be attached to the skin of parent wing 10 by preparing the surface of the skin of wing 10 in a manner appropriate for adhesive 23 and attaching a suitable jig to parent wing 10 and then adhesively affixing pads 20 to parent wing 10 while using the jig to guide the placements of pads 20.

Modified leading edge 12 comprises a shell 25 that is mountable to attachment pads 20. Shell 25 defines the aerodynamic shape of modified leading edge 12. Shell 25 has a shape that blends with the shape of parent wing 10 to provide a modified airfoil having aerodynamic characteristics that are different from the aerodynamic characteristics of parent wing 10.

Shell 25 may be made from any suitable material that can withstand the environment and conditions an aircraft would typically be exposed to and can be shaped to form the desired aerodynamic profile. Shell 25 is advantageously light in weight. For example, shell 25 may comprise:
  a skin of a suitable metal, such as aluminum;
  a suitable composite material, such as a carbon-fibre composite;
  a plastic skin; or
  the like.
In example embodiments of the invention:
  an alloy sheet is rolled to form the desired shape of modified leading edge 12.
  alloy sheets are formed in a vacuum mold and bonded together to create a structure having the desired shape for shell 25.

Any suitable means may be employed to mount shell 25 to attachment pads 20. By way of example, shell 25 may be mounted to attachment pads 20 with suitable fasteners such as (but not limited to) rivets, screws, nuts and bolts, or the like; suitable couplings; or the like.

In the illustrated embodiment, each pad 20 supports one or more projections 28A penetrated by apertures 29A. Modified leading edge 12 has projections 28B penetrated by apertures 29B. When modified leading edge 12 is in place on parent wing 10, apertures 29A and 29B are aligned with one another along both edges of modified leading edge 12. Pins 30 can then be inserted to extend through apertures 29A and 29B to retain modified leading edge 12 on parent wing 10.

In the illustrated embodiment, projections 28A and 28B interdigitate with one another. Projections 28A have widths that are substantially the same as the widths of the gaps between projections 28B, and vice versa such that projections 28A and 28B form substantially-continuous lines along the edges of modified leading edge 12.

In an embodiment of the invention, projections 28B extend from an elongated member 32 which extends along modified leading edge 12. Member 32 and projections 28B may be provided, for example, by one half of a hinge, such as a piano hinge. In such embodiments, pads 20 may comprise sections of a mating half of the hinge.

Details of construction of the illustrated example modified leading edge 12 will now be described. Shell 25 is supported by a number of internal supports 34. Each support 34 comprises a web 36 attached to a peripheral flange 38. Webs 36 of internal supports 34 may be apertured to reduce weight.

A front edge 40A of each internal support 34 is curved to hold shell 25 in the desired shape. Shell 25 may be attached to internal supports 34 in any suitable manner. In the illustrated embodiment, rivets 41 attach shell 25 to flanges 38. Rear edges 40B of internal supports 34 are curved to conform with the leading edge of parent wing 10. Internal supports 34 are preferably spaced apart along modified leading edge 12 at locations such that internal supports 34 are generally aligned with ribs 24 of parent wing 10. In some embodiments, an internal support 34 is aligned with each rib 24 of parent wing 10.

A protective sheet 42 is provided between the rear edges 40B of internal supports 34 and parent wing 10. Protective sheet 42 may, for example, comprise a sheet of a suitable elastomeric material such as rubber, a closed cell foam, another elastomeric material, a plastic sheet, anti-chafing tape, a gasket, or the like. Protective sheet 42 protects the skin on the leading edge of parent wing 10 from abrasion by any relative motion of modified leading edge 12 and parent wing 10.

Spines 44A and 44B extend along the modified leading edge 12 and is connected to each of internal supports 34. Spines 44A and 44B stiffen modified leading edge 12 and help to resist flexing of a parent wing 10 to which modified leading edge 12 is affixed. In the illustrated embodiment, a first spine 44A extends along the upper trailing edge of modified leading edge 12 and a second spine 44B extends along the lower trailing edge of modified leading edge 12. Spines 44A and 44B are preferably each continuous. Each one of spines 44A and 44B has a C-shaped cross section.

Projections 28B are mounted to spines 44A and 44B. In the illustrated embodiment, this is achieved by attaching elongated members 32 to spines 44A and 44B. In alternative embodiments, projections 28B could extend directly from spines 44A and 44B.

Modified leading edge 12 should blend smoothly into parent wing 10. Removable coverings 45 extend over pads 20 to close out the space between modified leading edge 12 and parent wing 10. Coverings 45 may be removed to visually inspect or non-destructively test pads 20 and their attachments to parent wing 10. Coverings 45 may be attached to modified leading edge 12 in any suitable manner. Trailing edges of coverings 45 may be blended into parent wing 10 with suitable fairing compound 46.

Modified leading edge 12 can be removed from parent wing 10 by removing upper and lower pins 30. Thus, modified leading edge 12 can be readily removed:

so that it can be repaired or replaced if it is damaged.
for inspection of the leading edge of parent wing 10 and the interior of modified leading edge 12.
in preparation for returning parent wing 10 to its original unmodified state.

The installation and removal of modified leading edge 12 can be accomplished without structural damage to parent wing 10 or to modified leading edge 12. A modified leading edge 12 may be removed from one aircraft and detachably secured to a second aircraft having the same parent wing, if desired.

In some embodiments, parent wing 10 is equipped with de-icing boots and modified leading edge 12 does not obstruct or affect the operation of the de-icing boots.

In some cases, the full aerodynamic benefits of a modified leading edge 12 are achieved when a modified leading edge 12 is combined with a winglet airfoil. If parent wing 10 is not already equipped with a winglet airfoil and a winglet airfoil is desired then a winglet airfoil may be added in any suitable manner.

Figure 2A:
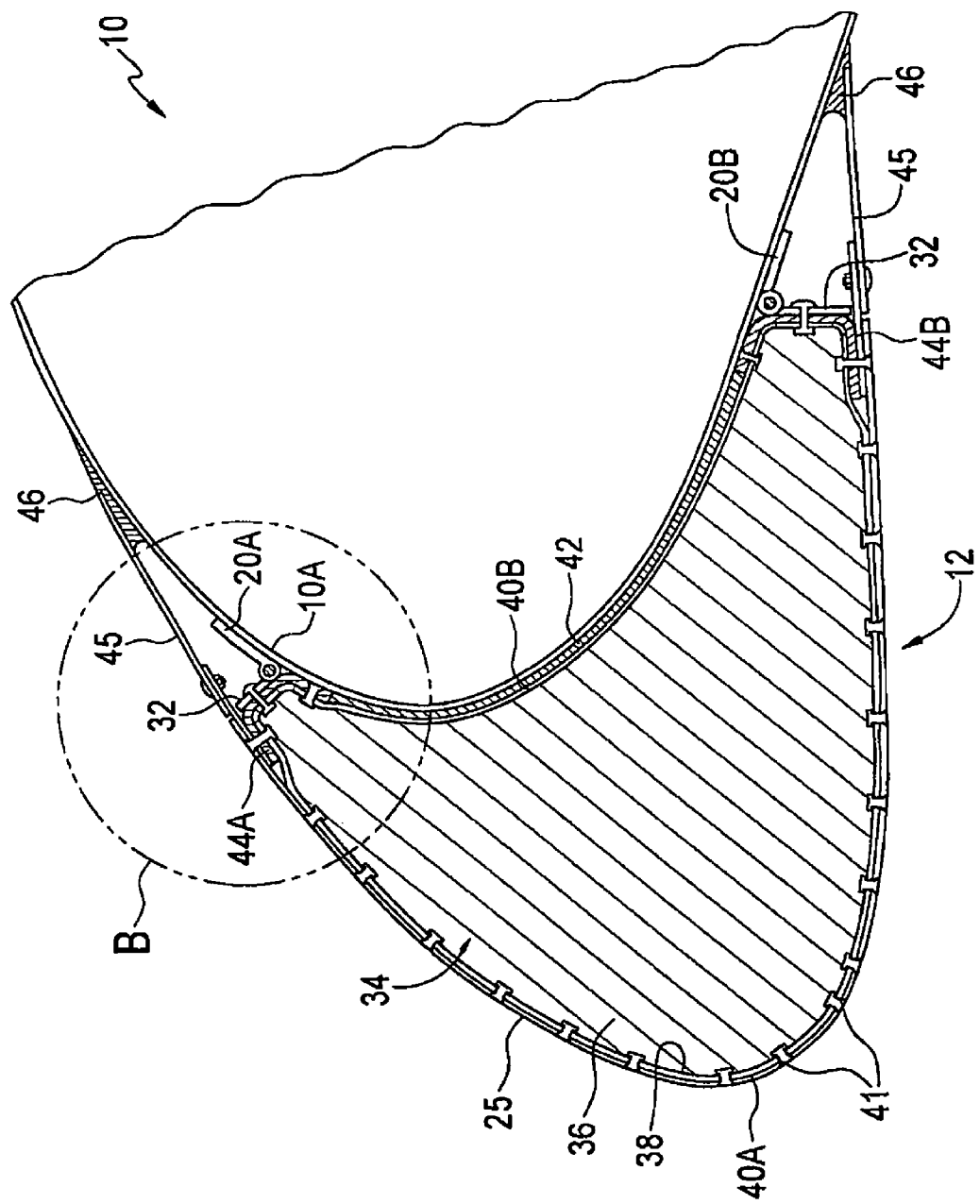
FIG. 2A is a sectional view of a modified leading edge detachably mounted on the parent leading edge.
Figure 2B:
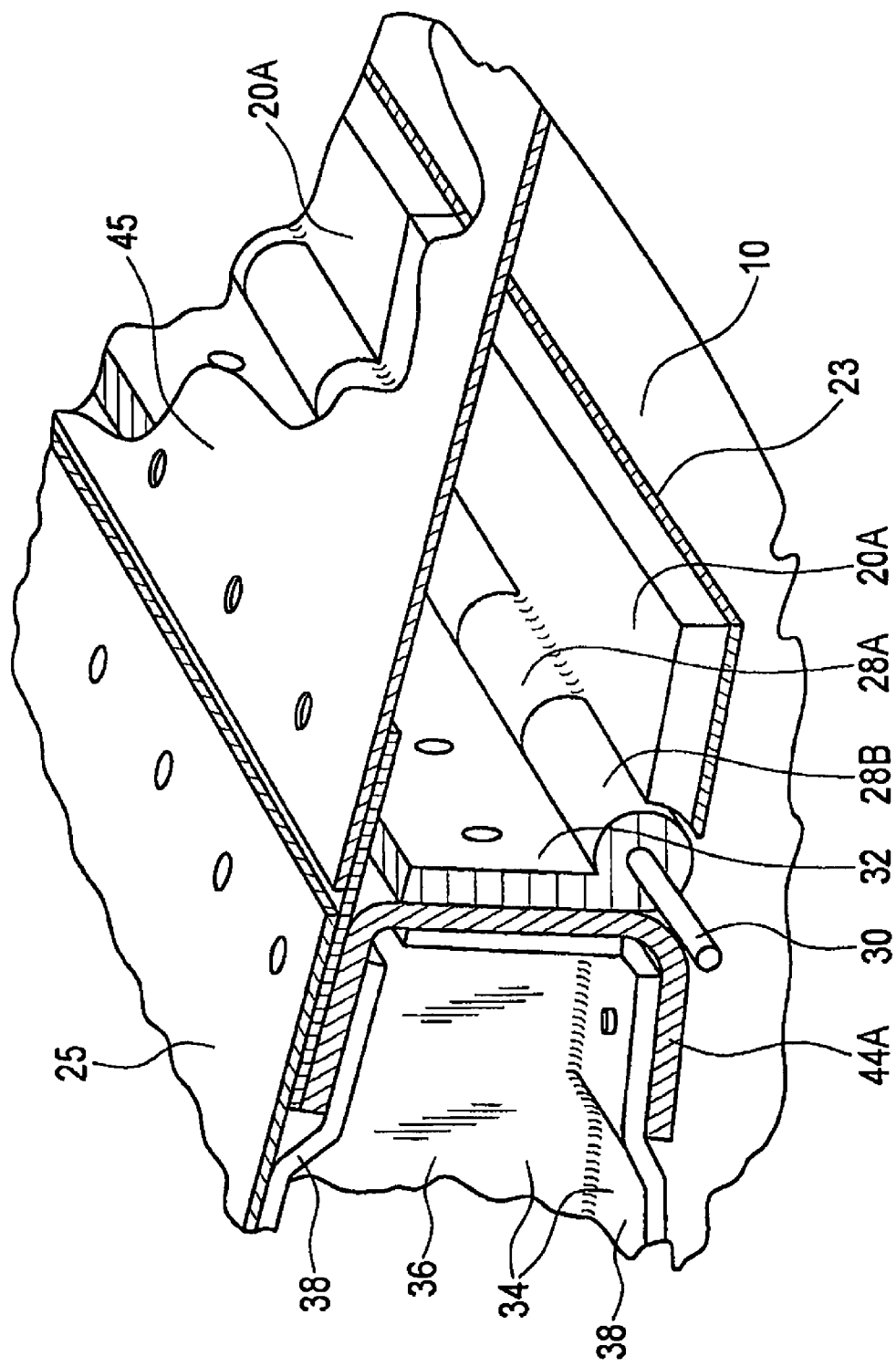
FIG. 2B is an enlarged view of portion B of FIG. 2A.
Figure 2C:
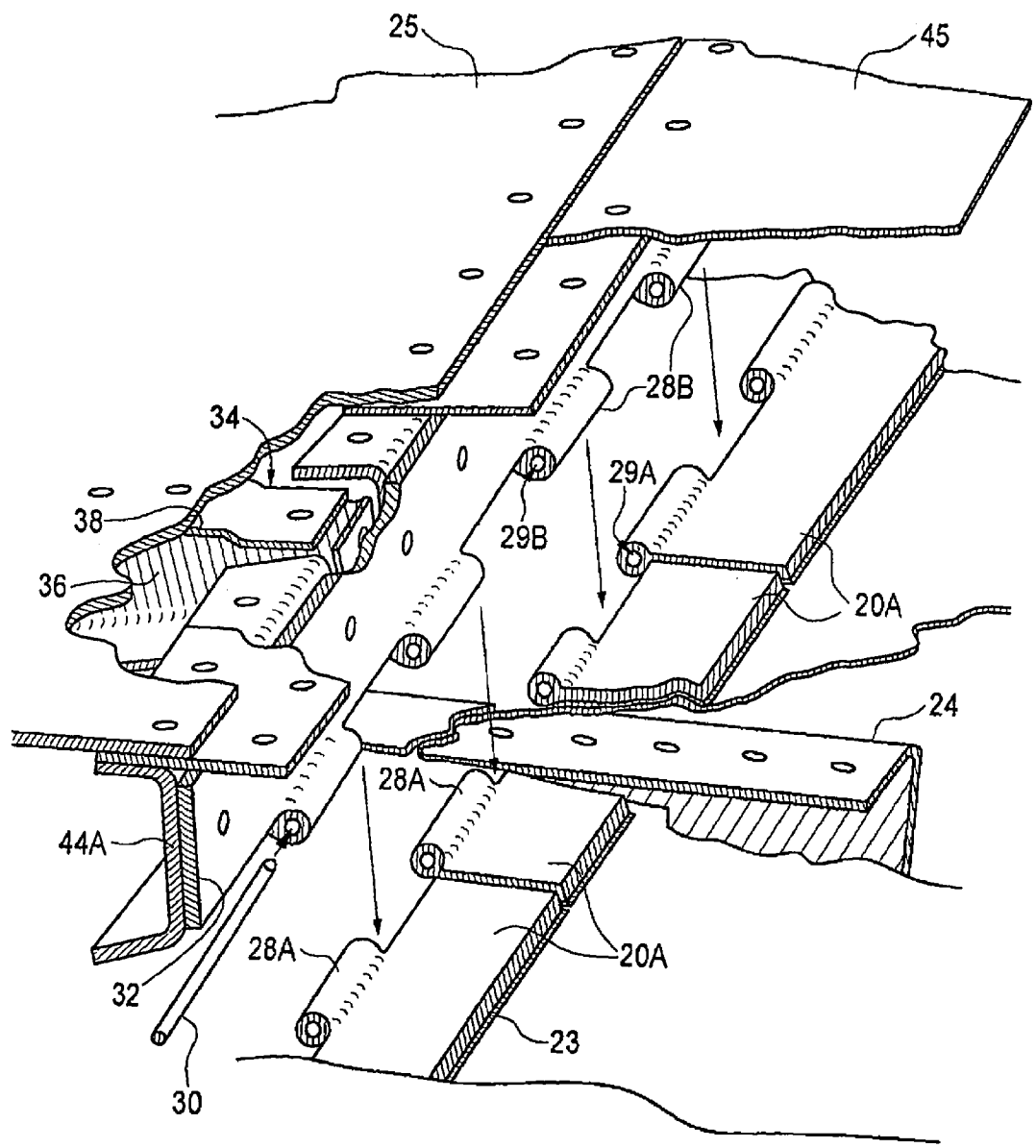
FIGS. 2C and 2D are partially cut-away views of a section of a wing equipped with a detachable modified leading edge.
Figure 2D:
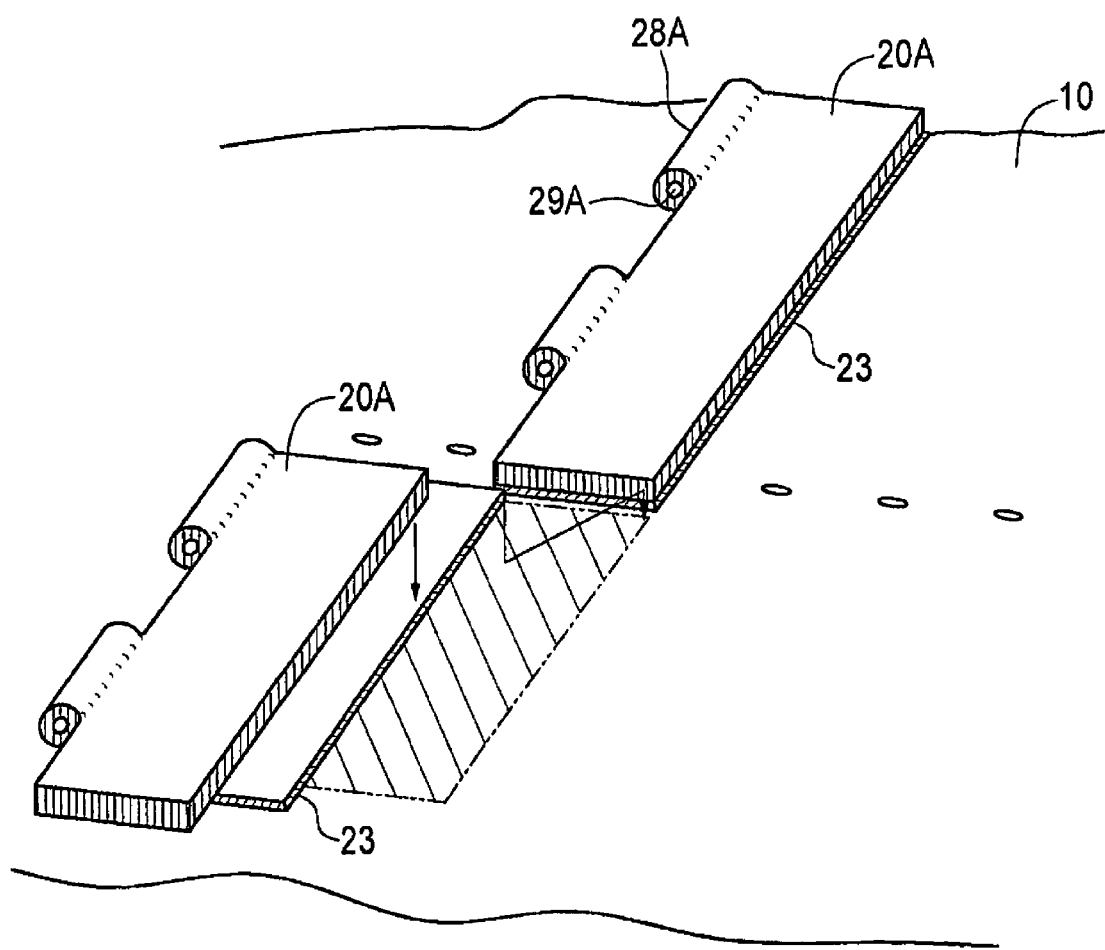
Figure 2E:
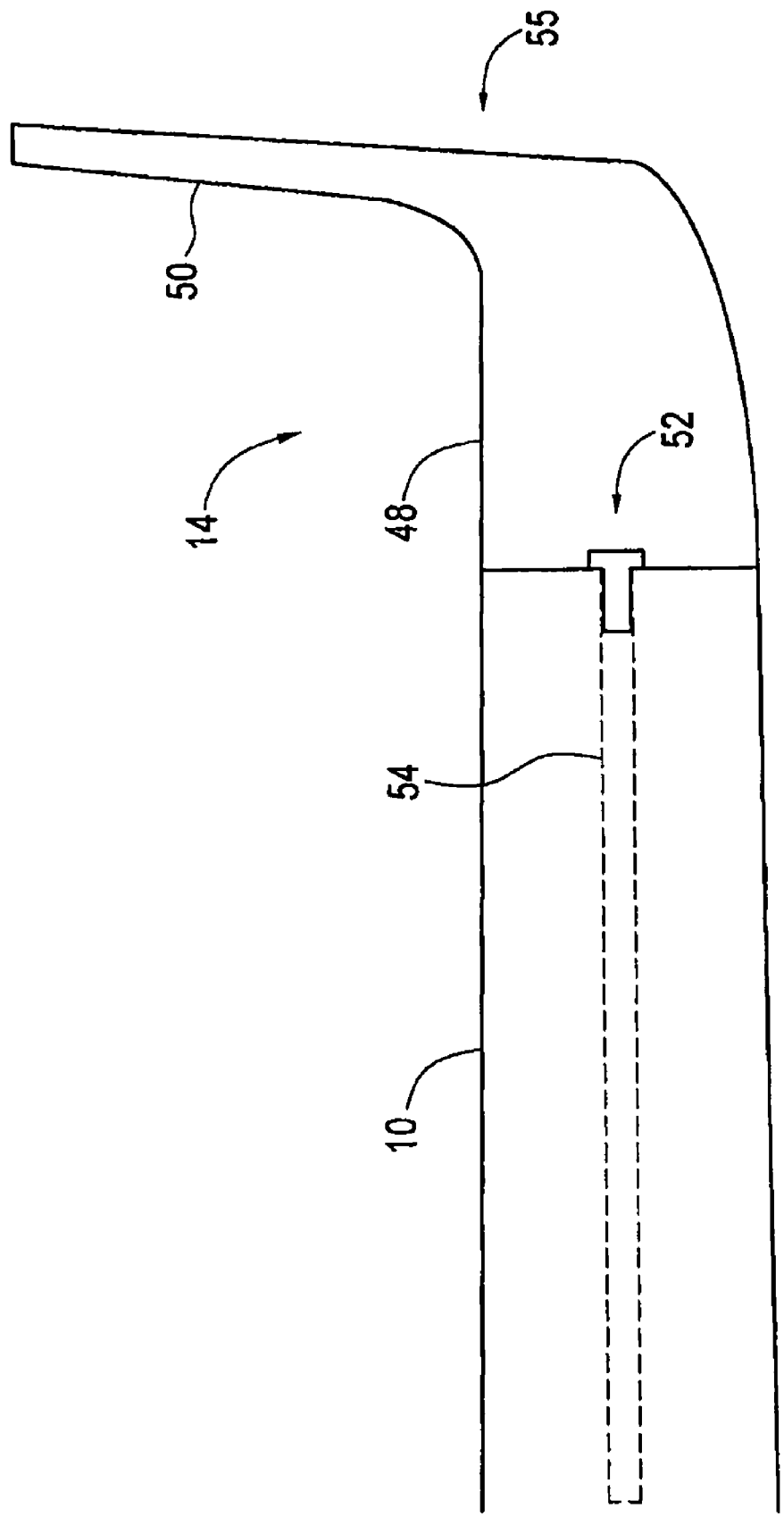
FIG. 2E shows a modified wing tip that may be added to a parent wing.

FIG. 2E shows an optional modified wing tip 14 that may be added to a parent wing 10. Modified wing tip 14 comprises a wingtip extension 48 and a winglet 50. Wing tip extension 48 is detachably affixed to the outer end of parent wing 10. Wingtip extension 48 may have a cross section that matches that of the adjoining parts of parent wing 10 and modified leading edge 12. In an embodiment of the invention, wing tip extension 48 is blended with winglet 50 and forms a single structure with winglet 50.

Modified wing tip 14 comprises a suitable coupling structure 52 that can be attached to a structure, such as a spar 53 of parent wing 10 by way of suitable fastening means 54 such as, but not limited to, tension bolts.

Winglet 50 may have any suitable airfoil shape. Coordinates defining a non-limiting example winglet airfoil are set out in Table 3. The presence of winglet 50 may enhance the performance of the hybrid airfoil made up of parent wing 10 and modified leading edge 12 by one or more of improving its stability, increasing its lift, and reducing its drag. Winglet 50 is preferably upturned and blended into wing extension 48 to promote stable air flow over the outboard section of the ailerons at low speeds and at stagnation. This enhances control over roll when flying slowly such as during a short take off or landing.

In one example embodiment, winglet 50 is oriented at a toe out angle that is between −1° to −3° (e.g. −2°) at its root 55. Winglet 50 may also be canted outward, for example at an angle in the range of 10° to 14° (e.g. 12°) for enhanced stability. Winglet 50 may also be twisted with, for example 4° to 8° (e.g. 6°) of wash-in at its tip.

Modified leading edges, as described above, may be applied to any of a wide variety of aircraft having wings based on any of a wide variety of airfoil shapes. There are particular benefits to providing a modified leading edge, as described herein, in aircraft having wings based on NACA 23000-series airfoils. The inventor has determined that the addition of an appropriate generally "drooping" modified leading edge to a wing based upon the NACA 23000-series airfoil can have a number of beneficial effects including:

generation of an increase in lift at lower speeds and at higher angles of attack without a significant increase in drag in cruise.
lower approach speeds and shorter landing distances.
more gradual and gentler stall onset.
greater stall control.
increased fuel efficiency at high angles of attack.
reduced landing speeds without the use of landing flaps.
retarded onset of icing through curvature change.

As such, an aircraft having a NACA 23000-series wing equipped with a modified leading edge 12 may be able to survive hot climate or icing conditions that, before the modification, could cause fatal accidents.

Another aspect of the invention provides novel airfoil shapes. These airfoil shapes may be formed by:

applying a modified leading edge to a parent airfoil (either in the manner described above or in some other manner); or
making a wing or other aerodynamic structure in the novel airfoil shape.

The novel airfoil shapes can be generated by combining first and second airfoil shapes. In some embodiments, at least one of the airfoil shapes is a NACA 23000-series airfoil. In some embodiments, both of the airfoil shapes are NACA 23000-series airfoils.

Novel hybrid airfoil shapes may be generated by:

a) Selecting first and second airfoil shapes (where the intention is to design a hybrid airfoil that will be formed by attaching a modified leading edge to a parent wing then the first airfoil shape is a cross-section of the parent wing). The second airfoil shape ought to have a chord length within ±10% of chord length of the first airfoil shape. The leading edge of the second airfoil preferably has a leading-edge radius of curvature that is in the range of about 1.2% to 1.8% of the chord length of the second airfoil. The second airfoil preferably has the same relative thickness as the first airfoil to within a few percent (e.g. ±5% and preferably ±2%).

b) Plotting the first and second airfoil shapes.

c) Marking the chord line and mean camber line of the first and second airfoil shapes on the plots. The chord line is a straight line extending between the leading and trailing edges of the airfoil. The mean camber line is a line having points that are half-way between the upper and lower surfaces of the airfoil.

d) The percentage of camber of the airfoils can be determined by measuring the maximum distance from the chord line to the mean camber line and dividing the measurement by the length of the chord line.

e) The desired surface area of the modified wing is determined based upon the desired increase in lift.

f) The amount by which the chord of the first airfoil should be extended can be estimated by subtracting the area of a wing based upon the parent airfoil from the desired wing area to determine the desired increase in area. The increase in area can be divided by the length of the wing to obtain the desired increase in chord length.

g) The horizontal location for the new leading edge can be established by measuring forward from the leading edge of the first airfoil a distance equal to the desired increase in chord length. The sum of the chord length of the first airfoil and the desired increase in chord length may be called the "new length".

h) The second airfoil is then arranged to extend the first airfoil forward and downward. The leading edge of the second airfoil is located horizontally on the horizontal location for the new leading edge. The camber line of the second airfoil is arranged so that it intersects the camber line of the first airfoil at a location that is behind the leading edge of the first airfoil by 7% to 16% of the chord length of the first airfoil. The angle α between of the chord lines of the first and second airfoils is typically between 5 degrees and 20 degrees.

i) A camber line is drawn for the composite airfoil which is defined by the rear part of the first airfoil and the front part of the second airfoil. The camber line should not have any kinks or other abrupt changes in direction, especially in the vicinity of the intersection of the first and second airfoils. Parameters of the second airfoil and/or the position and orientation of the second airfoil may be adjusted to achieve a composite airfoil having a camber line that is smoothly curved. The camber line of the composite airfoil will begin following the camber line of the second airfoil, have a transitional region and then follow the camber line of the first airfoil. It is desirable that the transition region provide a gradual blending between the two camber lines.

j) The composite airfoil preferably has a camber that is increased by an amount in the range of 3.5% to 6.5% of the new length.

FIG. 3A shows an example application of this method for generating an airfoil shape. First (parent) airfoil 60 is a NACA 23017.424 having a chord line 61. The modified leading edge will follow the profile of a front section 64 of a second airfoil 66. In the illustrated embodiment, second airfoil 66 is a NACA 6415 airfoil. Second airfoil 66 has a chord line 67. Second airfoil 66 has been scaled to have a chord length that is the same as that of first airfoil 60. In this example embodiment it has been decided to design a composite airfoil 76 that has a chord length 6% longer than that of parent airfoil 60 so as to provide a 6% increase in wing area.

This can be achieved by positioning the leading edge of second airfoil 66 on a line 68 that is located at a distance of 106% of the chord length from the trailing edge 69 of first airfoil 60. Second airfoil 66 is inclined so that it projects forward and downward from the leading edge 62 of first airfoil 60. An angle, α, is formed between chord lines 61 and 67. α is selected to provide the desired aerodynamic characteristics for the composite wing. The inventor has determined that values for α between 8° and 15° tend to yield acceptable results.

α is selected to be an angle which results in the camber line 70 of the composite airfoil 76 being smooth. In FIG. 3A, first airfoil 60 has a camber line 72 and second airfoil 66 has a camber line 74. Appropriate values for α generally result in the tops of the first and second airfoils 60 and 66 being essentially tangent to one another at their point of intersection 65 so that they can blend smoothly to provide a composite airfoil.

After the shape of the composite airfoil 76 has been established, the cross-sectional shape for a modified leading edge 77 is what one obtains by taking the first airfoil 60 away from the composite airfoil 76. The cross section of a wing may be the same all along the wing or may change along the wing. Where the cross section of a wing varies along the length of the wing, the cross section of a modified leading edge 77 for use with that wing can also vary along the length of the wing.

Table 1 sets out the coordinates for a model-sized composite airfoil defined by a NACA 23017.424 parent airfoil having a modified leading edge based upon a NACA 6215 airfoil. Table 2 sets out the coordinates for the composite airfoil of Table 1 wherein the chord length has been normalized to facilitate scaling.

While a "pencil and paper" method for generating a hybrid airfoil shape is described above, those skilled in the art will understand that this description defines a class of airfoil shapes. Any suitable airfoil design aids may be used to facilitate the generation and testing by simulation of hybrid airfoil shapes coming within this class.

Figure 3C:
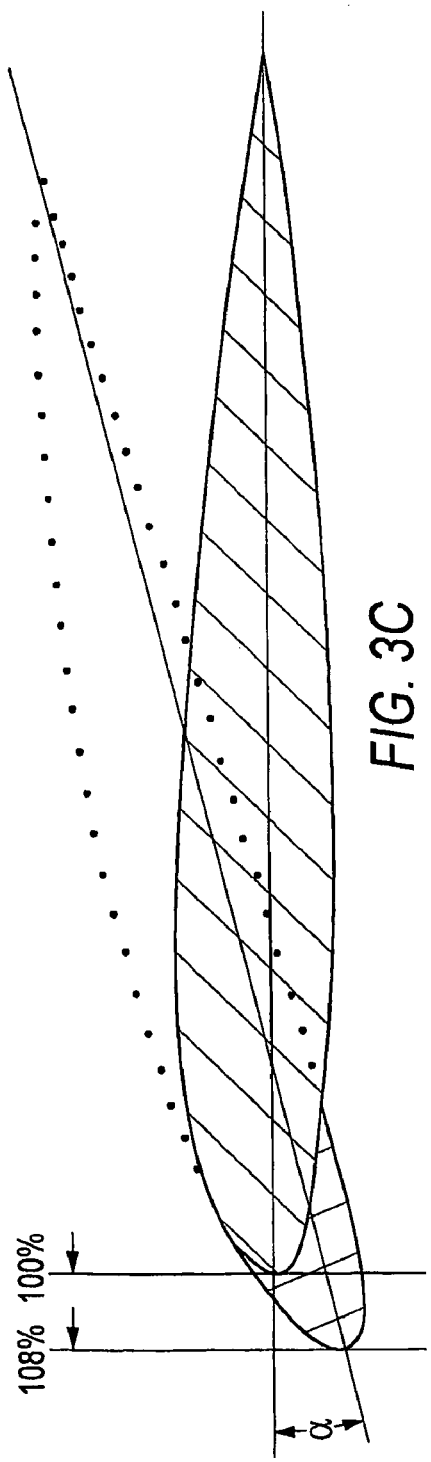
FIG. 3C is an overlay of a NACA 23012 parent airfoil and a Clark Y airfoil which can be used to identify a portion of the Clark Y airfoil to be used as a modified leading edge.
Figure 3D:
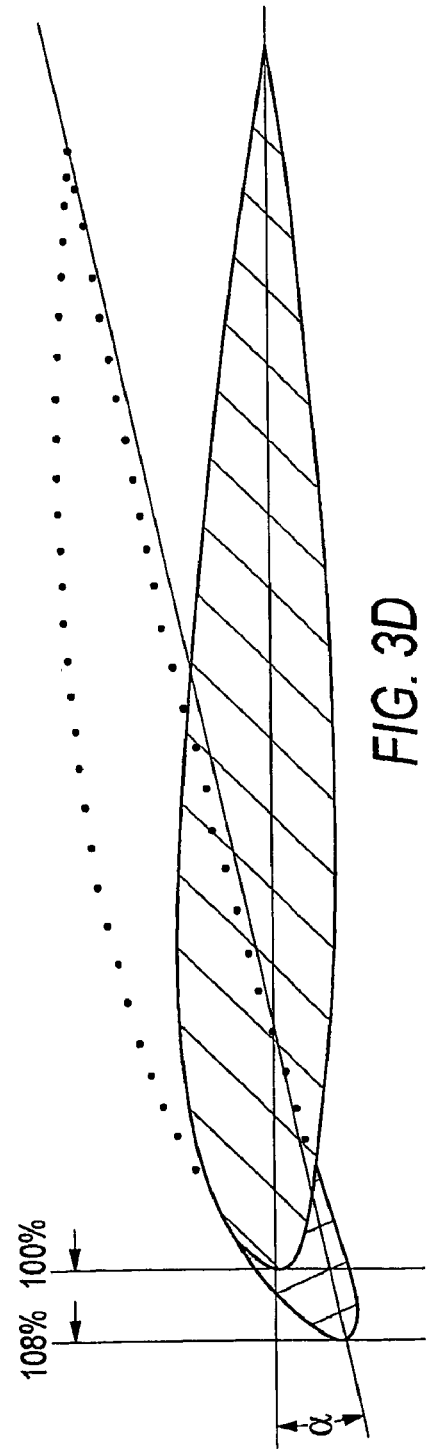
FIG. 3D is an overlay of a NACA 23012 parent airfoil and a NACA 6410 airfoil which can be used to identify a portion of the NACA 6410 airfoil to be used as a modified leading edge.

In some embodiments the first airfoil is a NACA 23000-series airfoil. The first and second airfoils combined in some specific non-limiting embodiments are as follows:

| First Airfoil | Second Airfoil | Figure |
| --- | --- | --- |
| NACA 23017.424 | NACA 6415 | FIG. 3A |
| NACA 23017.424 | NACA 6215 | FIG. 3F |
| NACA 23017.424 | Clark Y | FIG. 3B |
| NACA 23012 | Clark Y | FIG. 3C |
| NACA 23012 | NACA 6410 | FIG. 3D |
| NACA 23012 | NACA 6210 | FIG. 3E |

A wide range of different airfoils can be generated by scaling the thickness of the airfoils used in the above combinations. For example, a modified leading edge based upon a NACA 6000-series airfoil may be provided for a NACA 23000-series airfoil if the airfoils are scaled to have the same chord thicknesses. For example, the coordinates of Table 2 can be normalized to 1% chord thickness by dividing each of the positive and negative y values by 12. A composite airfoil having any desired chord thickness may be obtained by multiplying the normalized y values by the desired chord thickness (in per-cent). Non-limiting examples of NACA 6000-series airfoils are the NACA 6210, 6215, 6410 and 6415 airfoils. Non-limiting examples of NACA 23000 series airfoils are the NACA 23012, 23013.5, 23017.424 and 23018 airfoils.

Where a composite airfoil as described herein is used as a wing of an aircraft, additional advantages can be obtained by providing a winglet at the tip of the wing. The winglet can improve flight characteristics of aircraft equipped with such wings.

Specific Example 1

Cessna Caravan 208

An unmodified Cessna Caravan aircraft has a wing having a NACA 23017.424 airfoil at its root and a NACA 23012 airfoil at its tip. The airfoil shapes between the root and wing tip are intermediate between the NACA 23017.424 and 23012 airfoils.

A modified leading edge can be added to increase lift. The modified leading edge may be based upon NACA 6000-series airfoils. For example, at the root of the wing, the modified leading edge may be based upon a NACA 6215 airfoil (see FIG. 3F). At the wing tip the modified leading edge may be based upon a NACA 6210 airfoil (see FIG. 3E). The modified leading edge may blend between these airfoil shapes between the root and tip of the wing. Tables 1 and 3 provide coordinates that define the shapes of the root and tip composite airfoils respectively. The coordinates of Tables 1 and 3 are for model-sized airfoils but can be scaled to yield composite airfoils of any chord length.

The addition of the modified leading edge described above creates a composite wing that has a chord length at the root that is 8% longer than that of a stock Cessna Caravan 208 and a chord length at the tip that is 6% longer than that of a stock Cessna Caravan 208. The increase in chord length results in an increased wing area as compared to a stock Cessna Caravan 208. This increased wing area can result in increased lift.

As seen in Tables 3 to 5, if an aircraft is to carry greater weight under specified flying conditions, the wing area is one variable that may be increased to increase the coefficient of lift of the airfoil to avoid stall at such increased weight. Wing area can be increased by increasing the length of the wing (e.g. by attaching a modified wing tip) in addition to or instead of increasing the chord length through addition of a modified leading edge. Furthermore, a modified wing tip having a winglet can assists in stabilizing a composite wing, and can increase lift generally.

In the example above, the airfoils of the modified leading edge are blended to provide a continuous transition between the root and tip airfoils. As an alternative, the modified leading edge may change discontinuously at one or more locations. In such alternative embodiments, the modified leading edge has one airfoil shape in one portion of the semi-span and another airfoil shape in another portion of the semi-span. Vortex flow may be generated at the points at which the airfoil shape of the modified leading edge changes discontinuously.

Specific Example 2

Vans RV-8

The wing of an unmodified Vans RV-8 aircraft has a NACA 23013.5 airfoil. The wing is rectangular so that the airfoil shape is the same all along the wing.

Figure 4:
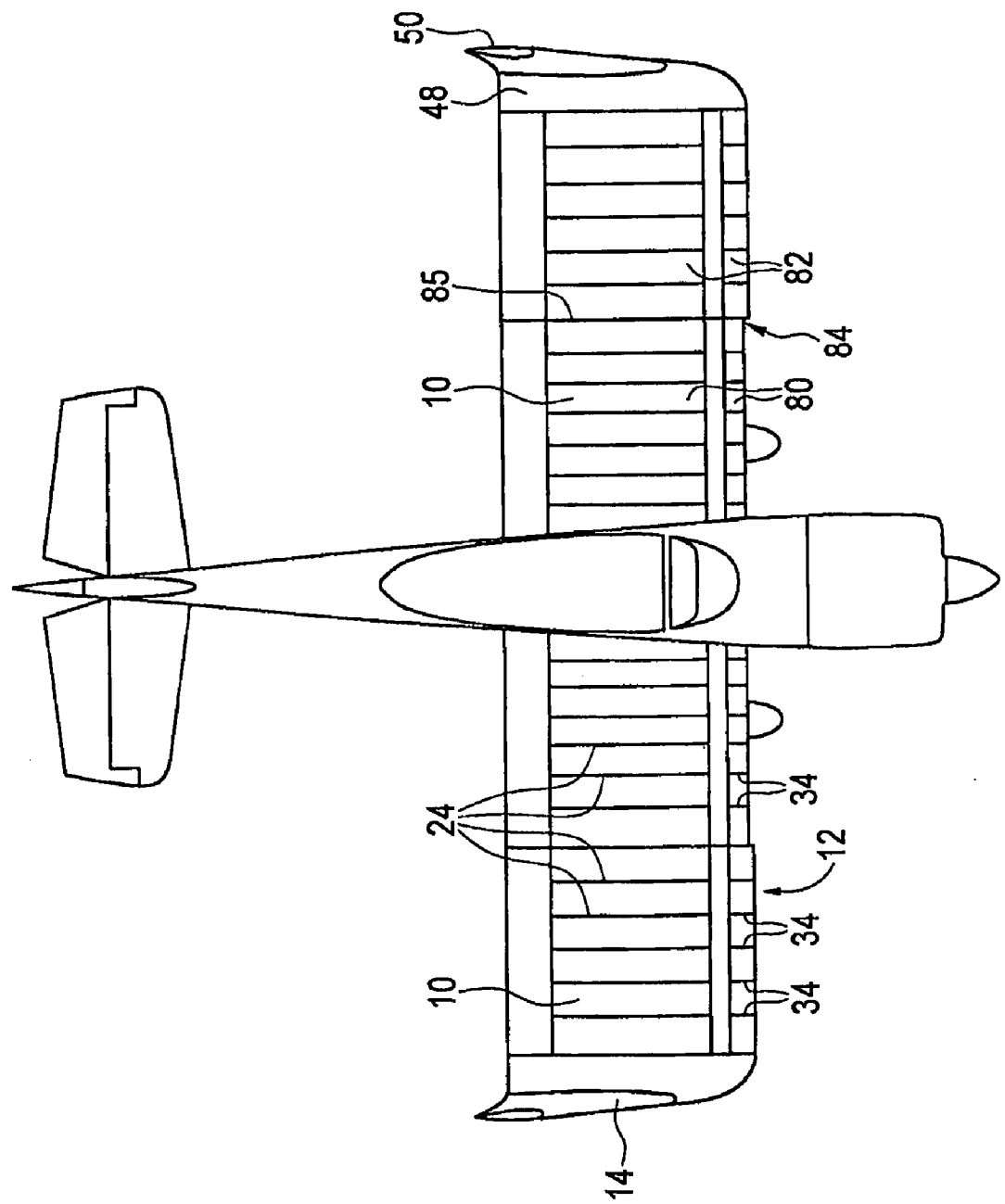
FIG. 4 is a plan view of a VANS RV-8 aircraft having wings equipped with modified leading edges and winglets.
Figure 5:
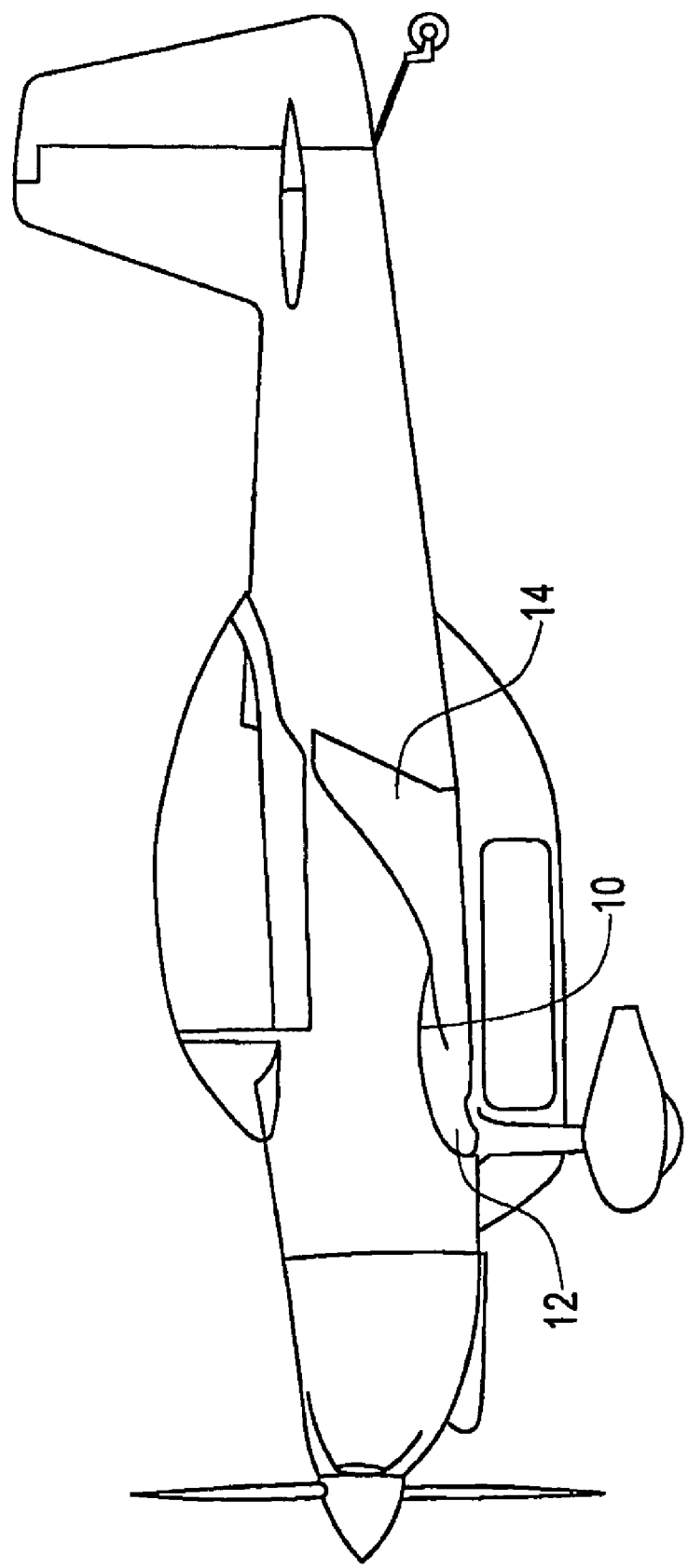
FIG. 5 is a side view of the aircraft of FIG. 4.

A modified leading edge for an aircraft that has a rectangular wing could have the same shape all along the wing. However, in this example, different portions of the modified leading edge have distinct airfoil shapes. In the embodiment illustrated in FIGS. 4 and 5, a first portion 80 toward the root of the wing has one airfoil shape while a second portion 82 toward the wing tip has a second airfoil shape. The first and second portions meet at a discontinuity 84. Discontinuity 84 is preferably located at a station line 85 of the wing (i.e. on a line extending between a flap and aileron of the wing.

In the illustrated embodiment, the composite airfoil of portion 82 near the wing tip has a chord length that is 8% greater than the chord length of the parent airfoil. The composite airfoil of portion 80 near the root of the wing has a chord length that is 6% greater than the chord length of the parent airfoil. In a specific embodiment, the modified leading edge comprises sections of NACA 6000-series airfoils of appropriate camber and thickness.

Similar to Example 1, the increase in chord length created by the addition of modified leading edge also increases the area of the wing. As discussed in Example 1, lift may be further enhanced by attaching a modified wing tip 14.

Alternative Applications

Composite airfoils as disclosed above may also be applied to other fields. For example, such airfoils may have application to:

Blades of windmills or wind turbines.
Hydrofoils.
Helicopter rotor blades.

Where a component (e.g. a wing, strut, rib, member, assembly, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

TABLE 1

17.424% Thickness NACA 23017.424 modified with
a NACA 6215 6% chord increase over parent chord

| X | +Y | −Y |
|---|---|---|
| 0 | 0.035 | −0.086 |
| 0.2 | 0.0865 | −0.1195 |
| 0.4 | 0.127 | −0.1575 |
| 0.6 | 0.1665 | −0.19 |
| 0.8 | 0.2175 | −0.2285 |
| 1 | 0.25 | −0.2575 |
| 1.2 | 0.2935 | −0.2875 |
| 1.4 | 0.332 | −0.3275 |
| 1.6 | 0.366 | −0.367 |
| 1.8 | 0.4095 | −0.3855 |
| 2 | 0.4515 | −0.4215 |
| 2.2 | 0.4875 | −0.455 |
| 2.4 | 0.5175 | −0.4905 |
| 2.6 | 0.556 | −0.524 |
| 2.8 | 0.599 | −0.554 |
| 3 | 0.6305 | −0.582 |
| 3.2 | 0.6625 | −0.6215 |
| 3.4 | 0.7035 | −0.6505 |
| 3.6 | 0.747 | −0.6775 |
| 3.8 | 0.785 | −0.6995 |
| 4 | 0.8195 | −0.7325 |
| 4.2 | 0.8545 | −0.766 |
| 4.4 | 0.884 | −0.7985 |
| 4.6 | 0.92 | −0.8195 |
| 4.8 | 0.9495 | −0.8365 |
| 5 | 0.982 | −0.867 |
| 5.2 | 1.0085 | −0.8945 |
| 5.4 | 1.0365 | −0.9275 |
| 5.6 | 1.0605 | −0.9545 |
| 5.8 | 1.088 | −0.973 |
| 6 | 1.115 | −0.991 |
| 6.2 | 1.139 | −1.025 |
| 6.4 | 1.176 | −1.0505 |
| 6.6 | 1.2115 | −1.0655 |
| 6.8 | 1.2445 | −1.093 |
| 7 | 1.271 | −1.1245 |
| 7.2 | 1.291 | −1.1455 |
| 7.4 | 1.312 | −1.1545 |
| 7.6 | 1.3325 | −1.1815 |
| 7.8 | 1.3605 | −1.1965 |
| 8 | 1.3805 | −1.2095 |
| 8.2 | 1.4 | −1.227 |
| 8.4 | 1.416 | −1.248 |
| 8.6 | 1.4395 | −1.2625 |
| 8.8 | 1.4545 | −1.2795 |
| 9 | 1.476 | −1.3015 |
| 9.2 | 1.495 | −1.3105 |
| 9.4 | 1.5075 | −1.328 |
| 9.6 | 1.526 | −1.3395 |
| 9.8 | 1.5405 | −1.351 |
| 10.2 | 1.5725 | −1.387 |
| 10.4 | 1.5875 | −1.374 |
| 10.6 | 1.5945 | −1.3895 |
| 10.8 | 1.601 | −1.3955 |
| 11 | 1.612 | −1.3975 |
| 11.2 | 1.6185 | −1.399 |
| 11.4 | 1.6285 | −1.409 |
| 11.6 | 1.6355 | −1.411 |
| 11.8 | 1.647 | −1.407 |
| 12 | 1.6485 | −1.401 |
| 12.2 | 1.646 | −1.395 |
| 12.4 | 1.6385 | −1.3895 |
| 12.6 | 1.6335 | −1.38 |
| 12.8 | 1.6315 | −1.376 |
| 13 | 1.625 | −1.3705 |
| 13.2 | 1.612 | −1.349 |
| 13.4 | 1.599 | −1.34 |
| 13.6 | 1.583 | −1.3275 |
| 13.8 | 1.5665 | −1.3045 |
| 14 | 1.551 | −1.279 |

TABLE 1-continued 17.424% Thickness NACA 23017.424 modified with a NACA 6215 6% chord increase over parent chord

| X | +Y | −Y |
|---|---|---|
| 14.2 | 1.5285 | −1.266 |
| 14.4 | 1.507 | −1.237 |
| 14.6 | 1.4715 | −1.196 |
| 14.8 | 1.437 | −1.154 |
| 15 | 1.392 | −1.1255 |
| 15.2 | 1.3395 | −1.084 |
| 15.4 | 1.2805 | −1.06 |
| 15.6 | 1.2115 | −1.0415 |
| 15.8 | 1.143 | −1.0465 |
| 16 | 1.0655 | −1.061 |
| 16.2 | 0.9695 | −1.0985 |
| 16.4 | 0.8615 | −1.146 |
| 16.6 | 0.7515 | −1.194 |
| 16.8 | 0.622 | −1.2305 |
| 17 | 0.4845 | −1.2615 |
| 17.1 | 0.4165 | −1.277 |
| 17.2 | 0.329 | −1.289 |
| 17.3 | 0.2485 | −1.2925 |
| 17.4 | 0.152 | −1.29 |
| 17.5 | 0.0495 | −1.2815 |
| 17.6 | −0.048 | −1.2665 |
| 17.7 | −0.16 | −1.237 |
| 17.8 | −0.303 | −1.1835 |
| 17.85 | −0.39 | −1.145 |
| 17.9 | −0.5235 | −1.1025 |
| 17.95 | −0.622 | −1.033 |
| 18 | −0.855 | −0.857 |

TABLE 2

| X (normalized) | +Y | −Y |
|---|---|---|
| 0 | 0.001944444 | −0.004777778 |
| 0.011111111 | 0.004805556 | −0.006638889 |
| 0.022222222 | 0.007055556 | −0.00875 |
| 0.033333333 | 0.00925 | −0.010555556 |
| 0.044444444 | 0.012083333 | −0.012694444 |
| 0.055555556 | 0.013888889 | −0.014305556 |
| 0.066666667 | 0.016305556 | −0.015972222 |
| 0.077777778 | 0.018444444 | −0.018194444 |
| 0.088888889 | 0.020333333 | −0.020388889 |
| 0.1 | 0.02275 | −0.021416667 |
| 0.111111111 | 0.025083333 | −0.023416667 |
| 0.122222222 | 0.027083333 | −0.025277778 |
| 0.133333333 | 0.02875 | −0.02725 |
| 0.144444444 | 0.030888889 | −0.029111111 |
| 0.155555556 | 0.033277778 | −0.030777778 |
| 0.166666667 | 0.035027778 | −0.032333333 |
| 0.177777778 | 0.036805556 | −0.034527778 |
| 0.188888889 | 0.039083333 | −0.036138889 |
| 0.2 | 0.0415 | −0.037638889 |
| 0.211111111 | 0.043611111 | −0.038861111 |
| 0.222222222 | 0.045527778 | −0.040694444 |
| 0.233333333 | 0.047472222 | −0.042555556 |
| 0.244444444 | 0.049111111 | −0.044361111 |
| 0.255555556 | 0.051111111 | −0.045527778 |
| 0.266666667 | 0.05275 | −0.046472222 |
| 0.277777778 | 0.054555556 | −0.048166667 |
| 0.288888889 | 0.056027778 | −0.049694444 |
| 0.3 | 0.057583333 | −0.051527778 |
| 0.311111111 | 0.058916667 | −0.053027778 |
| 0.322222222 | 0.060444444 | −0.054055556 |
| 0.333333333 | 0.061944444 | −0.055055556 |
| 0.344444444 | 0.063277778 | −0.056944444 |
| 0.355555556 | 0.065333333 | −0.058361111 |
| 0.366666667 | 0.067305556 | −0.059194444 |
| 0.377777778 | 0.069138889 | −0.060722222 |
| 0.388888889 | 0.070611111 | −0.062472222 |
| 0.4 | 0.071722222 | −0.063638889 |
| 0.411111111 | 0.072888889 | −0.064138889 |
| 0.422222222 | 0.074027778 | −0.065638889 |
| 0.433333333 | 0.075583333 | −0.066472222 |

TABLE 2-continued

| X (normalized) | +Y | −Y |
|---|---|---|
| 0.444444444 | 0.076694444 | −0.067194444 |
| 0.455555556 | 0.077777778 | −0.068166667 |
| 0.466666667 | 0.078666667 | −0.069333333 |
| 0.477777778 | 0.079972222 | −0.070388889 |
| 0.488888889 | 0.080805556 | −0.071083333 |
| 0.5 | 0.082 | −0.072305556 |
| 0.511111111 | 0.083055556 | −0.072805556 |
| 0.522222222 | 0.08375 | −0.073777778 |
| 0.533333333 | 0.084777778 | −0.074416667 |
| 0.544444444 | 0.085583333 | −0.075055556 |
| 0.555555556 | 0.086666667 | −0.075361111 |
| 0.566666667 | 0.087361111 | −0.075944444 |
| 0.577777778 | 0.088194444 | −0.076333333 |
| 0.588888889 | 0.088583333 | −0.077194444 |
| 0.6 | 0.088944444 | −0.077527778 |
| 0.611111111 | 0.089555556 | −0.077638889 |
| 0.622222222 | 0.089916667 | −0.077722222 |
| 0.633333333 | 0.090472222 | −0.078277778 |
| 0.644444444 | 0.090861111 | −0.078388889 |
| 0.655555556 | 0.0915 | −0.078166667 |
| 0.666666667 | 0.091583333 | −0.077833333 |
| 0.677777778 | 0.091444444 | −0.0775 |
| 0.688888889 | 0.091027778 | −0.077194444 |
| 0.7 | 0.09075 | −0.076666667 |
| 0.711111111 | 0.090638889 | −0.076444444 |
| 0.722222222 | 0.090277778 | −0.076138889 |
| 0.733333333 | 0.089555556 | −0.074944444 |
| 0.744444444 | 0.088833333 | −0.074444444 |
| 0.755555556 | 0.087944444 | −0.07375 |
| 0.766666667 | 0.087027778 | −0.072472222 |
| 0.777777778 | 0.086166667 | −0.071055556 |
| 0.788888889 | 0.084916667 | −0.070333333 |
| 0.8 | 0.083722222 | −0.068722222 |
| 0.811111111 | 0.08175 | −0.066444444 |
| 0.822222222 | 0.079833333 | −0.064111111 |
| 0.833333333 | 0.077333333 | −0.062527778 |
| 0.844444444 | 0.074416667 | −0.060222222 |
| 0.855555556 | 0.071138889 | −0.058888889 |
| 0.866666667 | 0.067305556 | −0.057861111 |
| 0.877777778 | 0.0635 | −0.058138889 |
| 0.888888889 | 0.059194444 | −0.058944444 |
| 0.9 | 0.053861111 | −0.061027778 |
| 0.911111111 | 0.047861111 | −0.063666667 |
| 0.922222222 | 0.04175 | −0.066333333 |
| 0.933333333 | 0.034555556 | −0.068361111 |
| 0.944444444 | 0.026916667 | −0.070083333 |
| 0.95 | 0.023138889 | −0.070944444 |
| 0.955555556 | 0.018277778 | −0.071611111 |
| 0.961111111 | 0.013805556 | −0.071805556 |
| 0.966666667 | 0.008444444 | −0.071666667 |
| 0.972222222 | 0.00275 | −0.071194444 |
| 0.977777778 | −0.002666667 | −0.070361111 |
| 0.983333333 | −0.008888889 | −0.068722222 |
| 0.988888889 | −0.016833333 | −0.06575 |
| 0.991666667 | −0.021666667 | −0.063611111 |
| 0.994444444 | −0.029083333 | −0.06125 |
| 0.997222222 | −0.034555556 | −0.057388889 |
| 1 | −0.0475 | −0.047611111 |

TABLE 3

12% Thickness NACA 23012 modified with a NACA 6210 8% chord increase over parent chord

| X | +Y | −Y |
|---|---|---|
| 0 | 0.01 | −0.01 |
| 0.125 | 0.0455 | −0.027 |
| 0.25 | 0.0615 | −0.03 |
| 0.375 | 0.087 | −0.037 |
| 0.5 | 0.107 | −0.0415 |
| 0.625 | 0.127 | −0.047 |
| 0.75 | 0.1445 | −0.0545 |
| 0.875 | 0.174 | −0.059 |
| 1 | 0.195 | −0.0655 |

TABLE 3-continued

12% Thickness NACA 23012 modified with a NACA 6210 8% chord increase over parent chord

| X | +Y | −Y |
|---|---|---|
| 1.125 | 0.222 | −0.077 |
| 1.25 | 0.244 | −0.0805 |
| 1.375 | 0.2685 | −0.0895 |
| 1.5 | 0.2955 | −0.0995 |
| 1.625 | 0.3115 | −0.1075 |
| 1.75 | 0.3355 | −0.12 |
| 1.875 | 0.355 | −0.1265 |
| 2 | 0.378 | −0.1305 |
| 2.125 | 0.401 | −0.1415 |
| 2.25 | 0.419 | −0.154 |
| 2.375 | 0.438 | −0.1675 |
| 2.5 | 0.456 | −0.1735 |
| 2.625 | 0.477 | −0.178 |
| 2.75 | 0.5055 | −0.19 |
| 2.875 | 0.5265 | −0.197 |
| 3 | 0.544 | −0.2015 |
| 3.125 | 0.56 | −0.2065 |
| 3.25 | 0.5855 | −0.2115 |
| 3.375 | 0.598 | −0.224 |
| 3.5 | 0.617 | −0.2325 |
| 3.625 | 0.635 | −0.2415 |
| 3.75 | 0.6615 | −0.2465 |
| 3.875 | 0.6745 | −0.2495 |
| 4 | 0.695 | −0.2525 |
| 4.125 | 0.713 | −0.259 |
| 4.25 | 0.7245 | −0.266 |
| 4.375 | 0.739 | −0.2755 |
| 4.5 | 0.754 | −0.2775 |
| 4.625 | 0.7745 | −0.2795 |
| 4.75 | 0.7935 | −0.2815 |
| 4.875 | 0.8125 | −0.2825 |
| 5 | 0.834 | −0.29 |
| 5.125 | 0.8435 | −0.293 |
| 5.25 | 0.853 | −0.2955 |
| 5.375 | 0.8685 | −0.2985 |
| 5.5 | 0.8845 | −0.305 |
| 5.625 | 0.8915 | −0.3055 |
| 5.75 | 0.9055 | −0.3065 |
| 5.875 | 0.9215 | −0.3075 |
| 6 | 0.9375 | −0.3085 |
| 6.125 | 0.9445 | −0.309 |
| 6.25 | 0.9585 | −0.31 |
| 6.375 | 0.97 | −0.3105 |
| 6.5 | 0.9765 | −0.307 |
| 6.625 | 0.986 | −0.3045 |
| 6.75 | 0.999 | −0.304 |
| 6.875 | 1.009 | −0.2995 |
| 7 | 1.0175 | −0.297 |
| 7.125 | 1.03 | −0.294 |
| 7.25 | 1.035 | −0.2885 |
| 7.375 | 1.0445 | −0.2795 |
| 7.5 | 1.0465 | −0.2725 |
| 7.625 | 1.048 | −0.2705 |
| 7.75 | 1.052 | −0.265 |
| 7.875 | 1.06 | −0.2535 |
| 8 | 1.0625 | −0.245 |
| 8.125 | 1.0695 | −0.2405 |
| 8.25 | 1.07 | −0.2365 |
| 8.375 | 1.069 | −0.2195 |
| 8.5 | 1.0685 | −0.21 |
| 8.625 | 1.068 | −0.198 |
| 8.75 | 1.061 | −0.1785 |
| 8.875 | 1.059 | −0.1615 |
| 9 | 1.0535 | −0.1545 |
| 9.125 | 1.0405 | −0.1405 |
| 9.25 | 1.0335 | −0.121 |
| 9.375 | 1.0235 | 0.108 |
| 9.5 | 1.011 | −0.0925 |
| 9.625 | 0.997 | −0.075 |
| 9.75 | 0.981 | −0.064 |
| 9.875 | 0.945 | −0.054 |
| 10 | 0.9145 | −0.58 |
| 10.125 | 0.8785 | −0.085 |
| 10.25 | 0.8535 | −0.109 |
| 10.375 | 0.805 | −0.139 |

TABLE 3-continued

12% Thickness NACA 23012 modified with a NACA 6210 8% chord increase over parent chord

| X | +Y | −Y |
|---|---|---|
| 10.5 | 0.76 | −0.1735 |
| 10.625 | 0.719 | −0.2115 |
| 10.75 | 0.6625 | −0.2345 |
| 10.875 | 0.5935 | −0.2625 |
| 11 | 0.5385 | −0.2865 |
| 11.125 | 0.442 | −0.304 |
| 11.25 | 0.3555 | −0.321 |
| 11.3125 | 0.3075 | −0.3335 |
| 11.375 | 0.25 | −0.337 |
| 11.4376 | 0.207 | −0.332 |
| 11.5 | 0.1355 | −0.32 |
| 11.5625 | 0.063 | −0.309 |
| 11.625 | −0.017 | −0.295 |
| 11.6875 | −0.1975 | −0.1975 |

TABLE 4

| X (normalized) | +Y | −Y |
|---|---|---|
| 0 | 0.000855615 | −0.000855615 |
| 0.010695187 | 0.003893048 | −0.00231016 |
| 0.021390374 | 0.005262032 | −0.002566845 |
| 0.032085561 | 0.00744385 | −0.003165775 |
| 0.042780749 | 0.00915508 | −0.003550802 |
| 0.053475936 | 0.01086631 | −0.00402139 |
| 0.064171123 | 0.012363636 | −0.004663102 |
| 0.07486631 | 0.014887701 | −0.005048128 |
| 0.085561497 | 0.016684492 | −0.005604278 |
| 0.096256684 | 0.018994652 | −0.006588235 |
| 0.106951872 | 0.020877005 | −0.006887701 |
| 0.117647059 | 0.022973262 | −0.007657754 |
| 0.128342246 | 0.025283422 | −0.008513369 |
| 0.139037433 | 0.026652406 | −0.009197861 |
| 0.14973262 | 0.028705882 | −0.01026738 |
| 0.160427807 | 0.030374332 | −0.010823529 |
| 0.171122995 | 0.032342246 | −0.011165775 |
| 0.181818182 | 0.03431016 | −0.012106952 |
| 0.192513369 | 0.035850267 | −0.013176471 |
| 0.203208556 | 0.037475936 | −0.014331551 |
| 0.213903743 | 0.039016043 | −0.01484492 |
| 0.22459893 | 0.040812834 | −0.015229947 |
| 0.235294118 | 0.043251337 | −0.016256684 |
| 0.245989305 | 0.045048128 | −0.016855615 |
| 0.256684492 | 0.046545455 | −0.017240642 |
| 0.267379679 | 0.047914439 | −0.017668449 |
| 0.278074866 | 0.050096257 | −0.018096257 |
| 0.268770053 | 0.051165775 | −0.019165775 |
| 0.299465241 | 0.052791444 | −0.019893048 |
| 0.310160428 | 0.054331551 | −0.020663102 |
| 0.320855615 | 0.05659893 | −0.021090909 |
| 0.331550802 | 0.0577123 | −0.021347594 |
| 0.342245989 | 0.059465241 | −0.021604278 |
| 0.352941176 | 0.061005348 | −0.022600428 |
| 0.363636364 | 0.061989305 | −0.022759358 |
| 0.374331551 | 0.063229947 | −0.023572193 |
| 0.385026738 | 0.064513369 | −0.023743316 |
| 0.395721925 | 0.06626738 | −0.023914439 |
| 0.406417112 | 0.067893048 | −0.024085561 |
| 0.417112299 | 0.069518717 | −0.024171123 |
| 0.427807487 | 0.071358289 | −0.024812834 |
| 0.438502674 | 0.072171123 | −0.025069519 |
| 0.449197861 | 0.072983957 | −0.025283422 |
| 0.459893048 | 0.07431016 | −0.025540107 |
| 0.470588235 | 0.075679144 | −0.026096257 |
| 0.481283422 | 0.076278075 | −0.026139037 |
| 0.49197861 | 0.077475936 | −0.026224599 |
| 0.502673797 | 0.07884492 | −0.02631016 |
| 0.513368984 | 0.080213904 | −0.026395722 |
| 0.524064171 | 0.080812834 | −0.026438503 |
| 0.534759358 | 0.082010695 | −0.026524064 |
| 0.545454545 | 0.082994652 | −0.026566845 |
| 0.556149733 | 0.083550802 | −0.02626738 |

TABLE 4-continued

| X (normalized) | +Y | −Y |
|---|---|---|
| 0.56684492 | 0.084363636 | −0.026053476 |
| 0.577540107 | 0.085475936 | −0.026010695 |
| 0.588235294 | 0.086331551 | −0.025625668 |
| 0.598930481 | 0.087058824 | −0.025411765 |
| 0.609625668 | 0.088128342 | −0.02515508 |
| 0.620320856 | 0.08855615 | −0.024684492 |
| 0.631016043 | 0.089368984 | −0.023914439 |
| 0.64171123 | 0.089540107 | −0.023315508 |
| 0.652406417 | 0.089668449 | −0.023144385 |
| 0.663101604 | 0.090010695 | −0.022673797 |
| 0.673796791 | 0.090695187 | −0.02168984 |
| 0.684491979 | 0.090909091 | −0.020962567 |
| 0.695187166 | 0.091508021 | −0.02057754 |
| 0.705882353 | 0.091550802 | −0.020235294 |
| 0.71657754 | 0.091465241 | −0.018780749 |
| 0.727272727 | 0.09142246 | −0.017967914 |
| 0.737967914 | 0.091379679 | −0.016941176 |
| 0.748663102 | 0.090780749 | −0.015272727 |
| 0.759358289 | 0.090609626 | −0.013818182 |
| 0.770053476 | 0.090139037 | −0.013219251 |
| 0.780748663 | 0.089026738 | −0.01202139 |
| 0.79144385 | 0.088427807 | −0.010352941 |
| 0.802139037 | 0.087572193 | 0.009240642 |
| 0.812834225 | 0.086502674 | −0.007914439 |
| 0.823529412 | 0.085304813 | −0.006417112 |
| 0.834224599 | 0.083935829 | −0.005475936 |
| 0.844919786 | 0.080855615 | −0.004620321 |
| 0.855614973 | 0.078245989 | −0.049625668 |
| 0.86631016 | 0.075165775 | −0.007272727 |
| 0.877005348 | 0.073026738 | −0.009326203 |
| 0.887700535 | 0.068877005 | −0.011893048 |
| 0.898395722 | 0.065026738 | −0.01484492 |
| 0.909090909 | 0.061518717 | −0.018096257 |
| 0.919786096 | 0.056684492 | −0.020064171 |
| 0.930481283 | 0.050780749 | −0.022459893 |
| 0.941176471 | 0.046074866 | −0.024513369 |
| 0.951871658 | 0.037818182 | −0.026010695 |
| 0.962566845 | 0.030417112 | −0.027465241 |
| 0.967914439 | 0.02631016 | −0.028534759 |
| 0.973262032 | 0.021390374 | −0.028834225 |
| 0.978618182 | 0.01771123 | −0.028406417 |
| 0.983957219 | 0.011593583 | −0.027379679 |
| 0.989304813 | 0.005390374 | −0.026438503 |
| 0.994652406 | −0.001454545 | −0.025240642 |
| 1 | −0.016898396 | −0.016898396 |

TABLE 5

CL Data at 8000 Lb's

For the Cessna Caravan 208 to fly at 8000/8360/9000 lbs the following CL'S will be required if the wing area stays the same as well as the stall speed.

| Gross Weight | Wing Area | Stall Speed | Flap Setting | CL Max. AFT C of G | Bank angle | Lift CL FWD C of G |
|---|---|---|---|---|---|---|
| 8000 | 279.4 sq ft | 75 K | 0 | 1.543827167 | 0 | |
| 8000 | 279.4 sq ft | 66 K | 10 | 1.993476582 | 0 | |
| 8000 | 279.4 sq ft | 62 K | 20 | 2.258987987 | 0 | |
| 8000 | 279.4 sq ft | 61 K | 30 | 2.333669032 | 0 | |
| 8000 | 279.4 sq ft | 75 K | 0 | | 0 | 1.543827167 |
| 8000 | 279.4 sq ft | 67 K | 10 | | 0 | 1.93440739 |
| 8000 | 279.4 sq ft | 63 K | 20 | | 0 | 2.187835275 |
| 8000 | 279.4 sq ft | 61 K | 30 | | 0 | 2.333669032 |
| 8000 | 306.1 sq ft NEW | 75 K | 0 | 1.408957554 | 0 | |
| 8000 | 306.1 sq ft NEW | 66 K | 10 | 1.819325559 | 0 | |
| 8000 | 306.1 sq ft NEW | 62 K | 20 | 2.06141521 | 0 | |
| 8000 | 306.1 sq ft NEW | 61 K | 30 | 2.129798388 | 0 | |
| 8000 | 306.1 sq ft NEW | 75 K | 0 | | 0 | 1.408957554 |
| 8000 | 306.1 sq ft NEW | 67 K | 10 | | 0 | 1.765416469 |
| 8000 | 306.1 sq ft NEW | 63 K | 20 | | 0 | 1.996704751 |
| 8000 | 306.1 sq ft NEW | 61 K | 30 | | 0 | 2.129798388 |

TABLE 6

CL Data at 8360 Lb's

| Gross Weight | Wing Area | Stall Speed | Flap Setting | Lift CL AFT C of G | Bank angle | Lift CL FWD C of G |
|---|---|---|---|---|---|---|
| 8360 | 279.4 sq ft | 75 K | 0 | 1.61329939 | 0 | |
| 8360 | 279.4 sq ft | 66 K | 10 | 2.083183028 | 0 | |
| 8360 | 279.4 sq ft | 62 K | 20 | 2.360642446 | 0 | |
| 8360 | 279.4 sq ft | 61 K | 30 | 2.438684138 | 0 | |
| 8360 | 279.4 sq ft | 75 K | 0 | | 0 | 1.61329939 |
| 8360 | 279.4 sq ft | 67 K | 10 | | 0 | 2.021455722 |
| 8360 | 279.4 sq ft | 63 K | 20 | | 0 | 2.286287862 |
| 8360 | 279.4 sq ft | 61 K | 30 | | 0 | 2.438684138 |
| 8360 | 306.1 sq ft NEW | 75 K | 0 | 1.472360644 | 0 | |
| 8360 | 306.1 sq ft NEW | 66 K | 10 | 1.901195209 | 0 | |
| 8360 | 306.1 sq ft NEW | 62 K | 20 | 2.154415389 | 0 | |
| 8360 | 306.1 sq ft NEW | 61 K | 30 | 2.225639316 | 0 | |
| 8360 | 306.1 sq ft NEW | 75 K | 0 | | 0 | 1.472360644 |
| 8360 | 306.1 sq ft NEW | 67 K | 10 | | 0 | 1.84486021 |

TABLE 6-continued

CL Data at 8360 Lb's

| Gross Weight | Wing Area | Stall Speed | Flap Setting | Lift CL AFT C of G | Bank angle | Lift CL FWD C of G |
|---|---|---|---|---|---|---|
| 8360 | 306.1 sq ft NEW | 63 K | 20 | | 0 | 2.0865564465 |
| 8360 | 306.1 sq ft NEW | 61 K | 30 | | 0 | 2.22563916 |

TABLE 7

CL Data At 9000 Lb's

| Gross Weight | Wing Area | Stall Speed | Flap Setting | Lift CL AFT C of G | Bank angle | Lift CL FWD C of G |
|---|---|---|---|---|---|---|
| 9000 | 279.4 sq ft | 75 K | 0 | 1.736805563 | 0 | |
| 9000 | 279.4 sq ft | 66 K | 10 | 2.242661155 | 0 | |
| 9000 | 279.4 sq ft | 62 K | 20 | 2.541361485 | 0 | |
| 9000 | 279.4 sq ft | 61 K | 30 | 2.625377661 | 0 | |
| 9000 | 279.4 sq ft | 75 K | 0 | | 0 | 1.736805563 |
| 9000 | 279.4 sq ft | 67 K | 10 | | 0 | 2.176208314 |
| 9000 | 279.4 sq ft | 63 K | 20 | | 0 | 2.461314684 |
| 9000 | 279.4 sq ft | 61 K | 30 | | 0 | 2.625377661 |
| 9000 | 306.1 sq ft NEW | 75 K | 0 | 1.585077248 | 0 | |
| 9000 | 306.1 sq ft NEW | 66 K | 10 | 2.046741254 | 0 | |
| 9000 | 306.1 sq ft NEW | 62 K | 20 | 2.319346711 | 0 | |
| 9000 | 306.1 sq ft NEW | 61 K | 30 | 2.396023187 | 0 | |
| 9000 | 306.1 sq ft NEW | 75 K | 0 | | 0 | 1.585077248 |
| 9000 | 306.1 sq ft NEW | 67 K | 10 | | 0 | 1.986093527 |
| 9000 | 306.1 sq ft NEW | 63 K | 20 | | 0 | 2.246292845 |
| 9000 | 306.1 sq ft NEW | 61 K | 30 | | 0 | 2.396023187 |

As will be apparent to those skilled in the art in the light of the foregoing disclosure, many alterations and modifications are possible in the practice of this invention without departing from the spirit or scope thereof. For example:

In cases where it is desirable to provide a detachable leading edge during the original manufacture of a wing, one could mount a modified leading edge 12 to the wing by way of projections that are built into the wing instead of by way of pads 20 that are affixed to the wing.

Alternative means could be provided to attach a modified leading edge to a parent wing. For example, a suitable hook and loop fastener material or the two halves of a zipper fastener could be applied to the parent wing and to the modified leading edge.

Accordingly, the scope of the invention is to be construed in accordance with the substance defined by the following claims.

What is claimed is:

1. A modified leading edge for a wing, the modified leading edge comprising:
   a plurality of couplers detachably affixable to a wing to be modified, and
   a leading edge comprising a connector detachably connectable to the plurality of couplers,
   wherein:
   the plurality of couplers constitutes a first group of couplers and the connector constitutes a first connector, the modified leading edge comprises a second group of couplers affixable to the wing and the modified leading edge comprises a second connector detachably affixable to the second group of couplers,
   the first connector comprises a plurality of first apertures aligned along the leading edge, an apertured part on each of the first group of couplers, and a first elongated retainer member insertable through the first apertures and the apertured parts on the first group of couplers and
   the second connector comprises a plurality of second apertures aligned along the leading edge, an apertured part on each of the second group of couplers, and a second elongated retainer member insertable through the second apertures and the apertured parts on the second group of couplers.

2. A modified leading edge according to claim 1 wherein the plurality of first apertures is aligned along an upper trailing side of the leading edge and the plurality of second apertures is aligned along a lower trailing side of the leading edge.

3. A modified leading edge according to claim 1 wherein, when the first connector is connected, the apertured parts on the first group of couplers are each between two of the first apertures.

4. A modified leading edge according to claim 1 comprising a curved shell supported by a plurality of internal supports, each of the plurality of internal supports comprising a web attached to a flange and having a leading edge curved to match a curvature of the shell.

5. A modified leading edge according to claim 4 comprising a spine extending along the modified leading edge and attached to the plurality of internal supports.

6. A modified leading edge according to claim 5 wherein the spine is C-shaped in cross section.

7. A modified leading edge according to claim 6 wherein the connector comprises a plurality of projections extending from the spine.

8. A modified leading edge according to claim 4 comprising a removable covering extending rearwardly from the shell to cover the couplers.

9. A modified leading edge according to claim 5 wherein the spine comprises a first spine extending along an upper trailing edge of the modified leading edge and the modified leading edge comprises a second spine connected to the plurality of internal supports and extending along a lower trailing edge of the modified leading edge.

10. A modified leading edge according to claim 1 comprising a protective layer on a rear side of the modified leading edge wherein the rear side has a curvature matching a curvature of a parent wing to which the modified leading edge is to be attached.

11. A modified leading edge according to claim 1 having a first cross sectional shape at a root end of the modified leading edge that is different from a second cross sectional shape of the modified leading edge at a tip end of the modified leading edge.

12. A modified leading edge according to claim 11 wherein the cross-sectional shape of the modified leading edge changes continuously along the modified leading edge from the first cross-sectional shape to the second cross-sectional shape.

13. A modified leading edge according to claim 11 wherein the cross-sectional shape of the modified leading edge changes discontinuously at least one location between the root and tip ends of the modified leading edge.

14. A modified leading edge according to claim 1 in combination with a parent wing wherein the couplers of the modified leading edge are adhesively mounted to a surface of the parent wing.

15. A modified leading edge and parent wing combination according to claim 14 comprising a modified wingtip detachably affixed at the tip of the wing.

16. A modified leading edge and parent wing combination according to claim 15 wherein the modified wing tip comprises a winglet.

17. A modified leading edge and parent wing combination according to claim 15 wherein the modified wing tip comprises a wing extension having a cross sectional shape substantially the same as a cross sectional shape of the modified leading edge and parent wing combination adjacent to the tip of the parent wing.

18. A modified leading edge and parent wing combination according to claim 14 wherein the parent wing comprises a NACA 23000-series airfoil.

19. A modified leading edge and parent wing combination according to claim 14 wherein the modified leading edge has a shape that follows a profile of a front section of a NACA 6000-series airfoil.

20. A modified leading edge and parent wing combination according to claim 14 wherein the modified leading edge has a shape that follows a profile of a front section of a Clark Y airfoil.

21. A modified leading edge according to claim 1 wherein the couplers comprise pads that are affixable to the wing to be modified and the apertured parts of the couplers comprise apertures extending through the couplers in a direction substantially parallel to a plane of the pads.

22. A modified leading edge and parent wing combination according to claim 14 wherein a rear face of the modified leading edge bears against an original leading edge of the parent wing.

23. A modified leading edge and parent wing combination according to claim 14 comprising an elongated fastening member extending through the connector and the plurality of couplers to connect the leading edge to the plurality of couplers, the elongated fastening member extending along a leading edge of the parent wing.

24. A modified leading edge according to claim 1 wherein the plurality of couplers are adhesively affixable to the wing.

25. A modified leading edge and parent wing combination comprising a modified leading edge in combination with a parent wing, the modified leading edge comprising a plurality of couplers detachably affixable to a wing to be modified and a leading edge comprising a connector detachably connectable to the plurality of couplers wherein the couplers of the modified leading edge are adhesively mounted to a surface of the parent wing, the connector comprises a plurality of apertured parts spaced apart along the modified leading edge, the couplers are apertured and the combination comprises an elongated fastening member that passes in alternation through apertures in the couplers and apertures in the apertured parts of the connector.

* * * * *